(12) United States Patent
Okamoto et al.

(10) Patent No.: US 11,034,517 B2
(45) Date of Patent: Jun. 15, 2021

(54) MOVEMENT ROUTE DETERMINATION METHOD AND PROGRAM

(71) Applicants: Toshihiro Okamoto, Kanagawa (JP); Koichi Kudo, Kanagawa (JP); Ichiro Maeda, Kanagawa (JP); Takayoshi Yokota, Tottori (JP); Tsubasa Tamura, Tottori (JP)

(72) Inventors: Toshihiro Okamoto, Kanagawa (JP); Koichi Kudo, Kanagawa (JP); Ichiro Maeda, Kanagawa (JP); Takayoshi Yokota, Tottori (JP); Tsubasa Tamura, Tottori (JP)

(73) Assignees: RICOH COMPANY, LTD., Tokyo (JP); NATIONAL UNIVERSITY COPORATION TOTTORI UNIVERSITY, Tottori (JP)

( * ) Notice: Subject to any disclaimer, the term of this patent is extended or adjusted under 35 U.S.C. 154(b) by 193 days.

(21) Appl. No.: 16/328,307

(22) PCT Filed: Sep. 5, 2017

(86) PCT No.: PCT/JP2017/031993
§ 371 (c)(1),
(2) Date: Feb. 26, 2019

(87) PCT Pub. No.: WO2018/043759
PCT Pub. Date: Mar. 8, 2018

(65) Prior Publication Data
US 2019/0210805 A1 Jul. 11, 2019

(30) Foreign Application Priority Data

Sep. 5, 2016 (JP) .................................. 2016-173195
Sep. 5, 2016 (JP) ............................. JP2016-173194

(51) Int. Cl.
*B65G 1/137* (2006.01)
*G01C 21/34* (2006.01)
(Continued)

(52) U.S. Cl.
CPC ............. *B65G 1/137* (2013.01); *G01C 21/20* (2013.01); *G01C 21/206* (2013.01); *G01C 21/34* (2013.01);
(Continued)

(58) Field of Classification Search
None
See application file for complete search history.

(56) References Cited

U.S. PATENT DOCUMENTS 8,473,195 B2 6/2013 Sambongi
8,862,386 B2 * 10/2014 Griffiths ............. G01C 21/3423
701/411
(Continued)

FOREIGN PATENT DOCUMENTS

CN 105184412 A 12/2015
CN 105404250 A 3/2016
(Continued)

OTHER PUBLICATIONS

International Search Report dated Dec. 12, 2017 in PCT/JP2017/031993 filed on Sep. 5, 2017.
(Continued)

*Primary Examiner* — Shelley Chen
(74) *Attorney, Agent, or Firm* — Harness, Dickey & Pierce, P.L.C.

(57) ABSTRACT

A method includes acquiring starting position information of moving bodies; acquiring destination position information of movement destinations; acquiring path information indicating paths on which the moving bodies can move; calculating, for each moving body, a minimum movement amount
(Continued)

required for the moving body to move on a path from the starting position to each movement destination, based on the starting position information, the destination position information, and the path information; allocating a movement destination not allocated to any moving body to a moving body that has a minimum movement amount being the smallest of the minimum movement amounts and that has no allocation of any movement destination; further allocating, when there is a movement destination not allocated to the moving body on a movement route, the not-allocated movement destination to the allocated moving body; and determining movement routes of the moving bodies based on the allocation.

10 Claims, 22 Drawing Sheets

(51) Int. Cl.
  *G01C 21/20* (2006.01)
  *G06Q 10/04* (2012.01)
  *G06Q 10/08* (2012.01)
  *G06Q 10/00* (2012.01)
(52) U.S. Cl.
  CPC ............ *G06Q 10/00* (2013.01); *G06Q 10/047* (2013.01); *G06Q 10/08* (2013.01)

(56) References Cited

U.S. PATENT DOCUMENTS

| | | | | |
|---|---|---|---|---|
| 9,046,379 | B2* | 6/2015 | Mineta | G01C 21/3469 |
| 2002/0026281 | A1* | 2/2002 | Shibata | G08G 1/202 |
| | | | | 701/29.1 |
| 2008/0109246 | A1* | 5/2008 | Russell | G06Q 10/04 |
| | | | | 705/1.1 |
| 2009/0105934 | A1 | 4/2009 | Tajima et al. | |
| 2010/0318289 | A1 | 12/2010 | Sambongi | |
| 2013/0060469 | A1* | 3/2013 | Chen | G01C 21/3469 |
| | | | | 701/527 |
| 2014/0100717 | A1* | 4/2014 | Yoneda | G05D 1/0297 |
| | | | | 701/2 |
| 2014/0100735 | A1* | 4/2014 | Yoneda | G06Q 10/047 |
| | | | | 701/25 |
| 2014/0121965 | A1* | 5/2014 | Kim | G06Q 10/083 |
| | | | | 701/527 |
| 2015/0073589 | A1* | 3/2015 | Khodl | B65G 1/1378 |
| | | | | 700/218 |
| 2016/0342946 | A1* | 11/2016 | Herraiz Herraiz | G06Q 10/08 |
| 2017/0219371 | A1* | 8/2017 | Suzuki | G01C 21/3484 |
| 2019/0210805 | A1* | 7/2019 | Okamoto | B65G 1/137 |

FOREIGN PATENT DOCUMENTS

| | | |
|---|---|---|
| CN | 105841704 A | 8/2016 |
| JP | 05-061133 | 3/1993 |
| JP | 11-085280 | 3/1999 |
| JP | 2002-060023 | 2/2002 |
| JP | 2005-263416 | 9/2005 |
| JP | 2007-033078 | 2/2007 |
| JP | 2013-089224 | 5/2013 |
| JP | 2016-052938 | 4/2016 |
| WO | WO-9804480 A1 | 2/1998 |

OTHER PUBLICATIONS

European Search Report dated May 21, 2019.
Chinese Office Action and English translation thereof dated Apr. 22, 2020.

* cited by examiner

[Fig. 1]
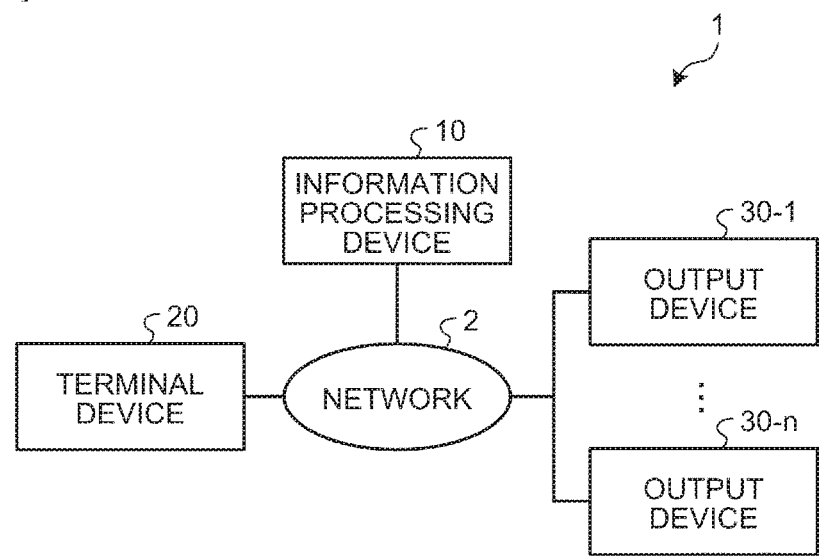
[Fig. 2]
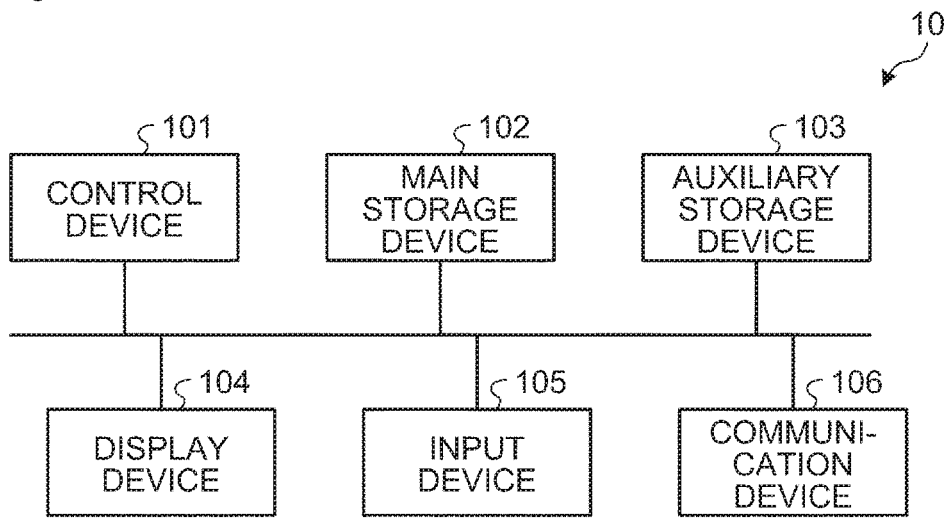

[Fig. 3]
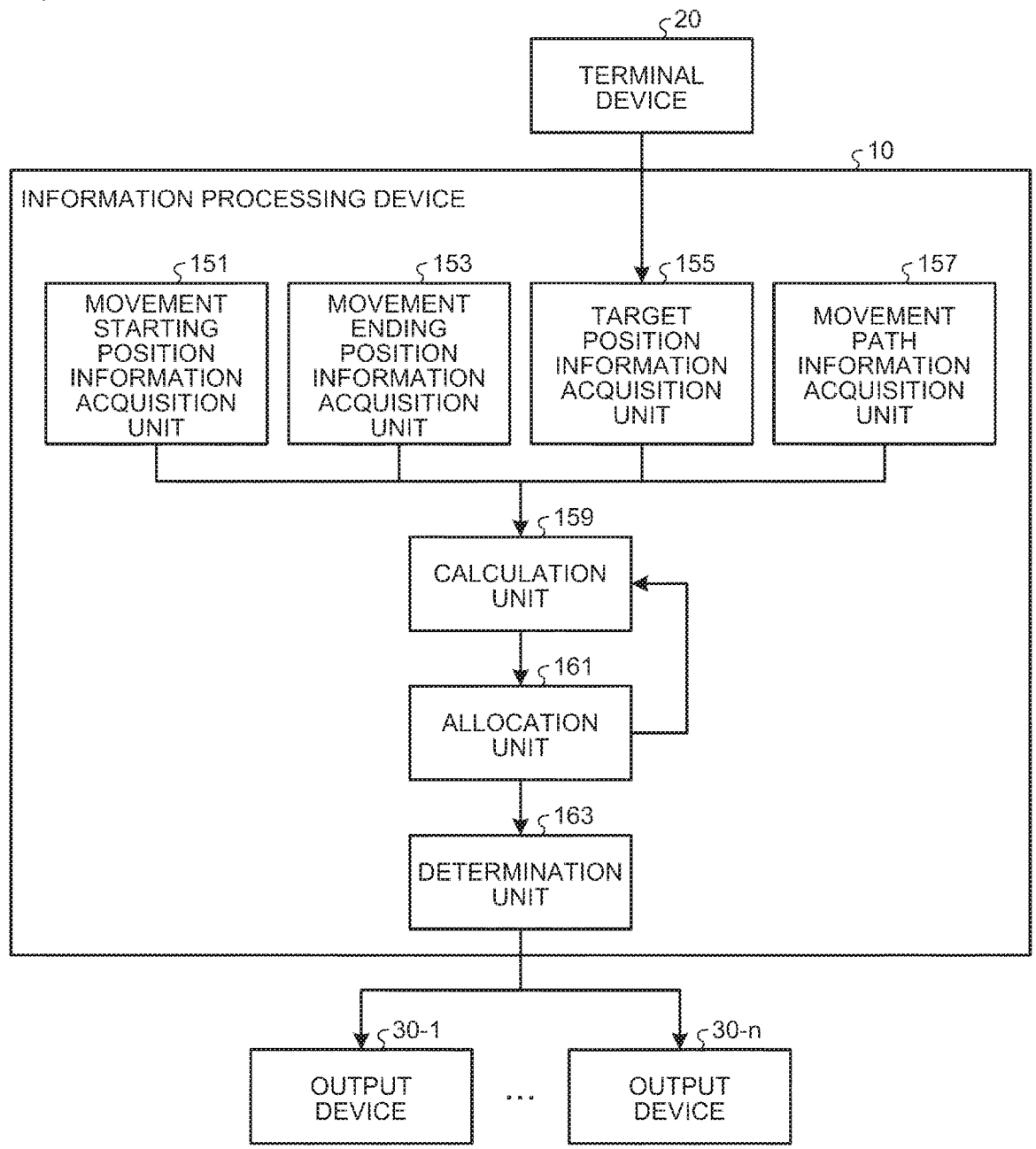

[Fig. 4]
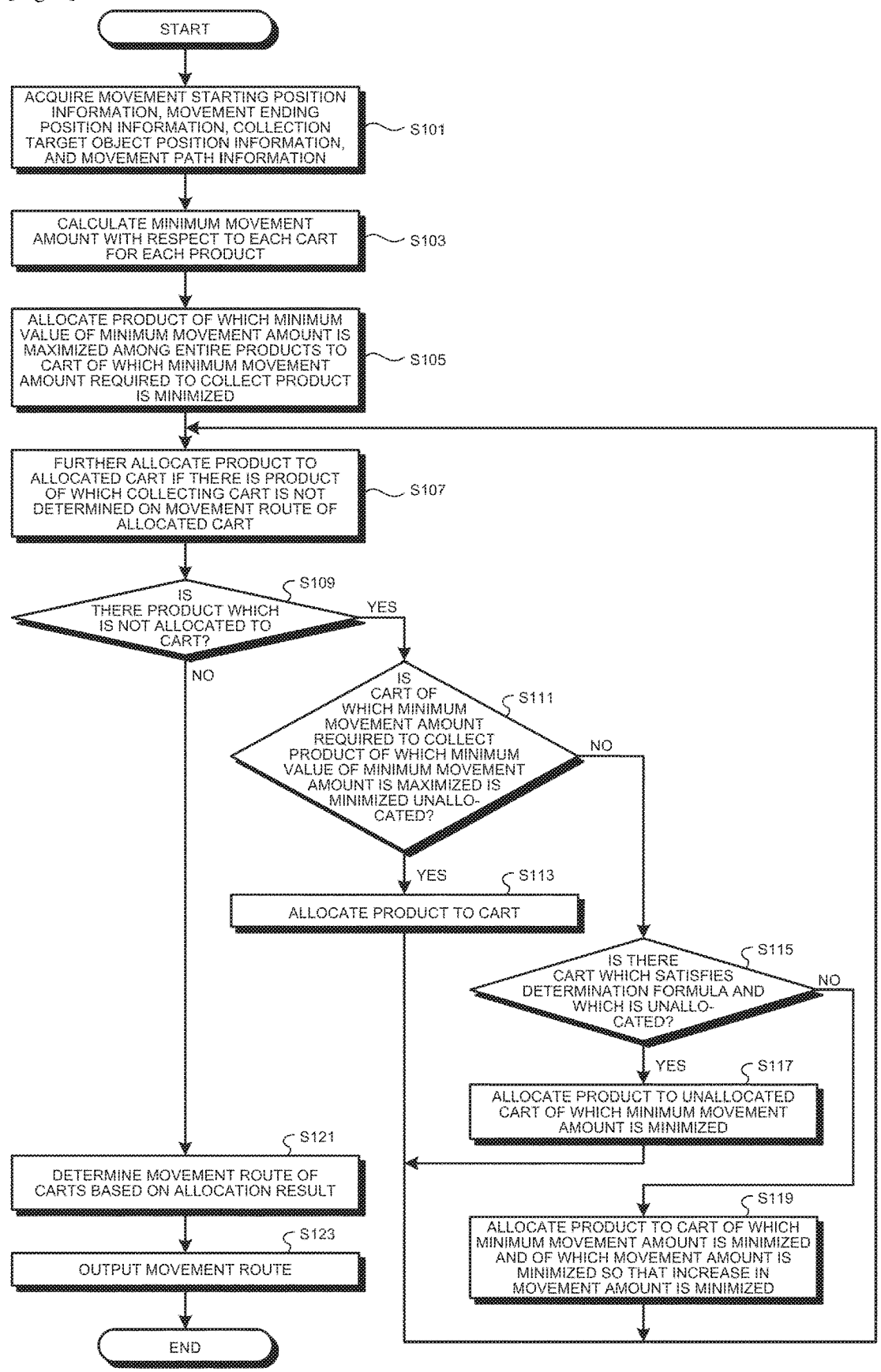

[Fig. 5]
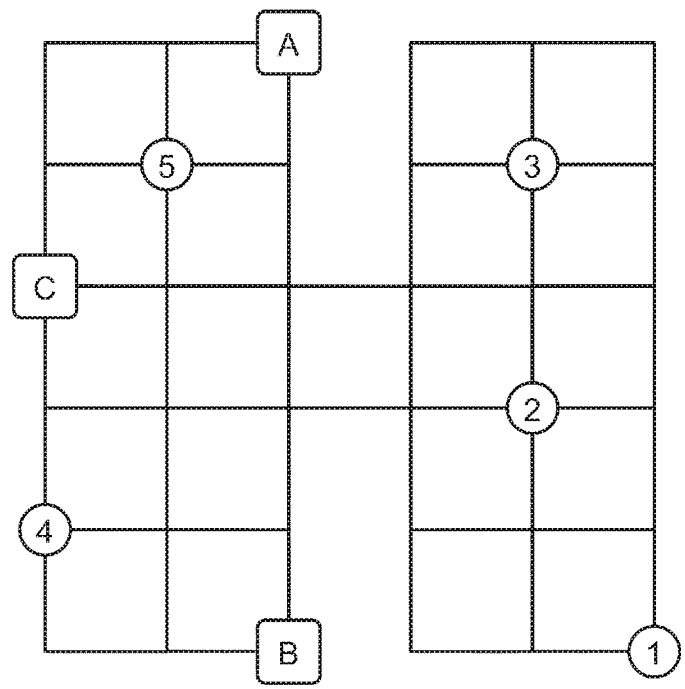
[Fig. 6]
| CART  PRODUCT | 1 | 2 | 3 | 4 | 5 |
|---|---|---|---|---|---|
| A | 8 | 5 | 5 | 6 | 2 |
| B | 7 | 4 | 6 | 3 | 5 |
| C | 8 | 5 | 5 | 2 | 2 |
| SHORTEST DISTANCE | 7 | 4 | 5 | 2 | 2 |
[Fig. 7]
| CART | A | B | C |
|---|---|---|---|
| A | – | 5 | 4 |
| B | 5 | – | 5 |
| C | 4 | 5 | – |

[Fig. 8]
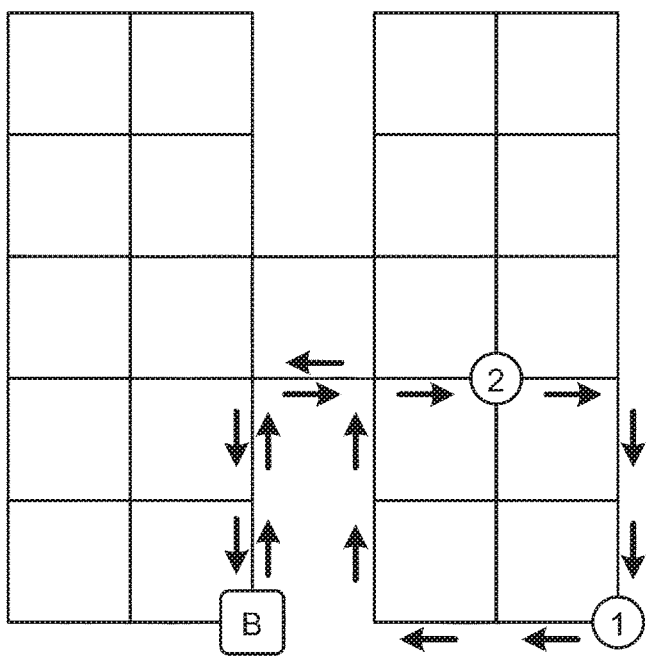
[Fig. 9]
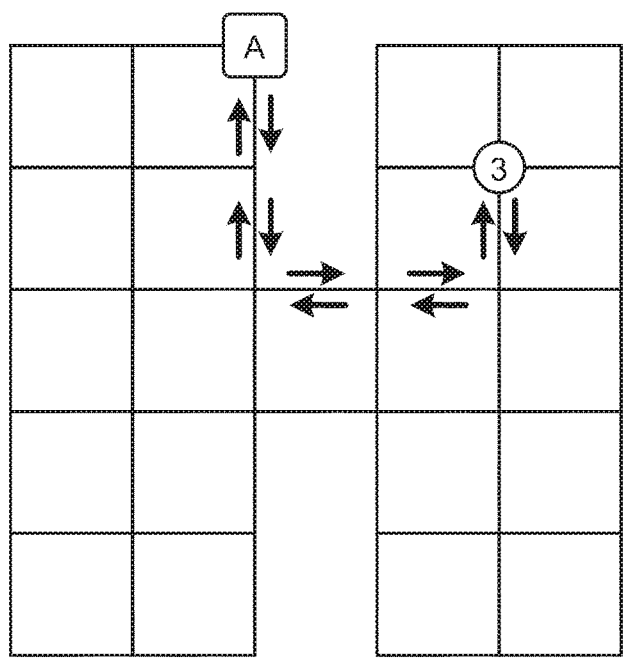

[Fig. 10]
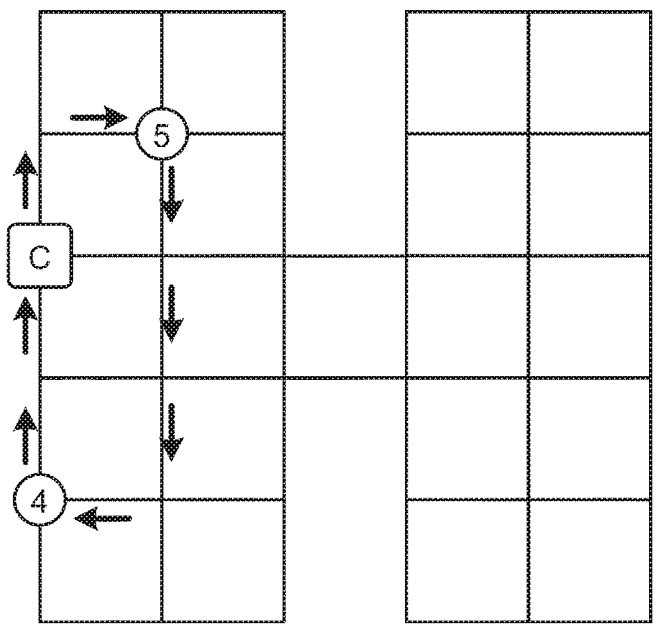
[Fig. 11]
| CART | ROUTE | DISTANCE |
|------|-------|----------|
| A | A→3→A | 10 |
| B | B→2→1→B | 14 |
| C | C→5→4→C | 8 |
[Fig. 12]
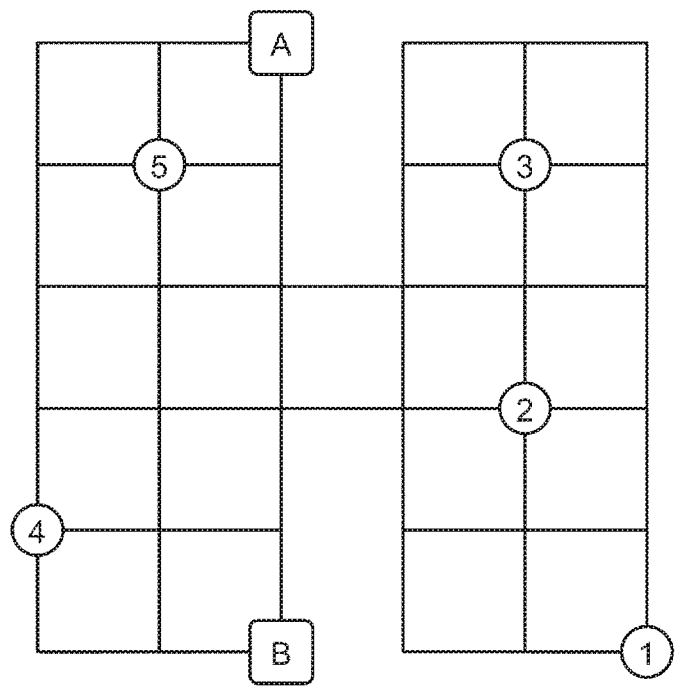

[Fig. 13]
| CART     PRODUCT | 1 | 2 | 3 | 4 | 5 |
|---|---|---|---|---|---|
| A | 8 | 5 | 5 | 6 | 2 |
| B | 7 | 4 | 6 | 3 | 5 |
| SHORTEST DISTANCE | 7 | 4 | 3 | 3 | 2 |
[Fig. 14]
| CART | A | B |
|---|---|---|
| A | – | 5 |
| B | 5 | – |
[Fig. 15]
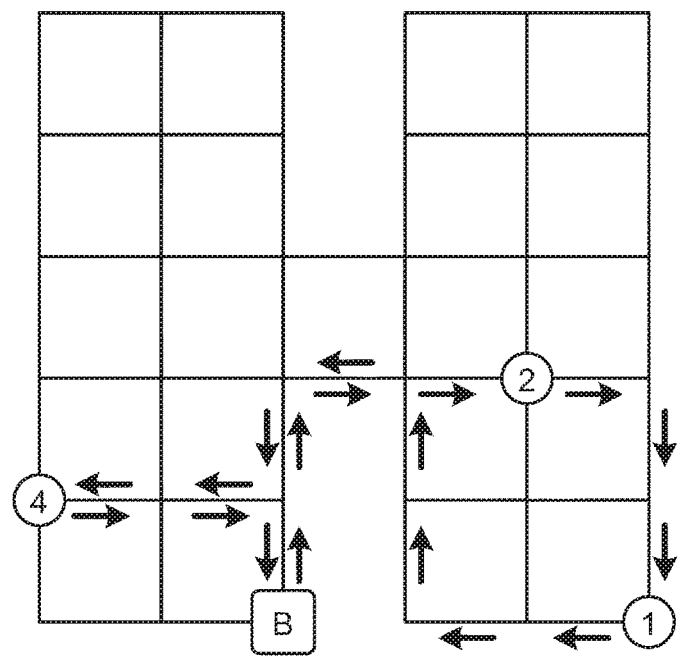

[Fig. 16]
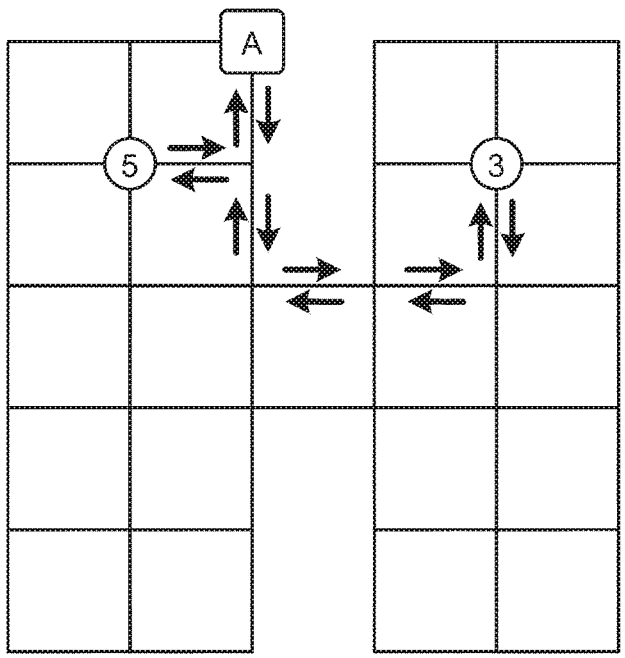
[Fig. 17]
| CART | ROUTE | DISTANCE |
|---|---|---|
| A | A→3→5→A | 12 |
| B | B→2→1→4→B | 18 |
[Fig. 18]
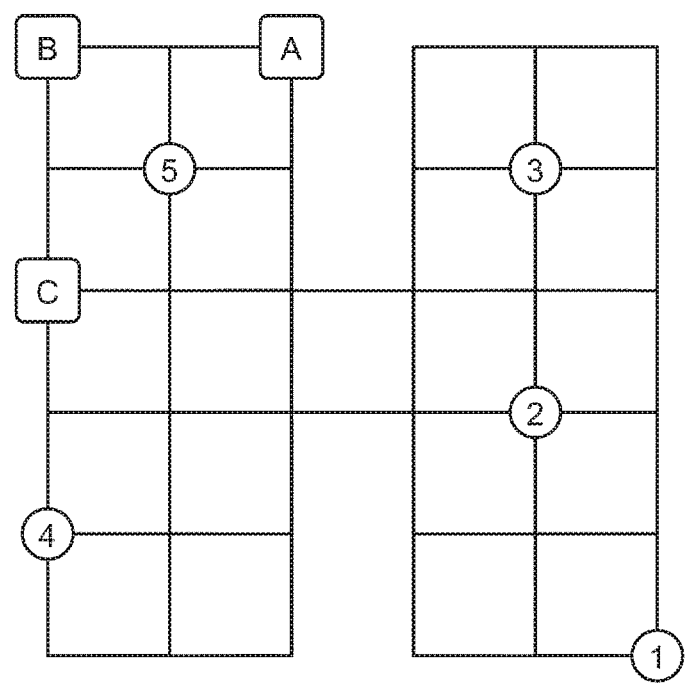

[Fig. 19]
| CART \ PRODUCT | 1 | 2 | 3 | 4 | 5 |
|---|---|---|---|---|---|
| A | 8 | 5 | 5 | 6 | 2 |
| B | 10 | 7 | 7 | 4 | 2 |
| C | 8 | 5 | 5 | 2 | 2 |
| SHORTEST DISTANCE | 8 | 5 | 5 | 2 | 2 |
[Fig. 20]
| CART | A | B | C |
|---|---|---|---|
| A | – | 2 | 4 |
| B | 2 | – | 2 |
| C | 4 | 2 | – |
[Fig. 21]
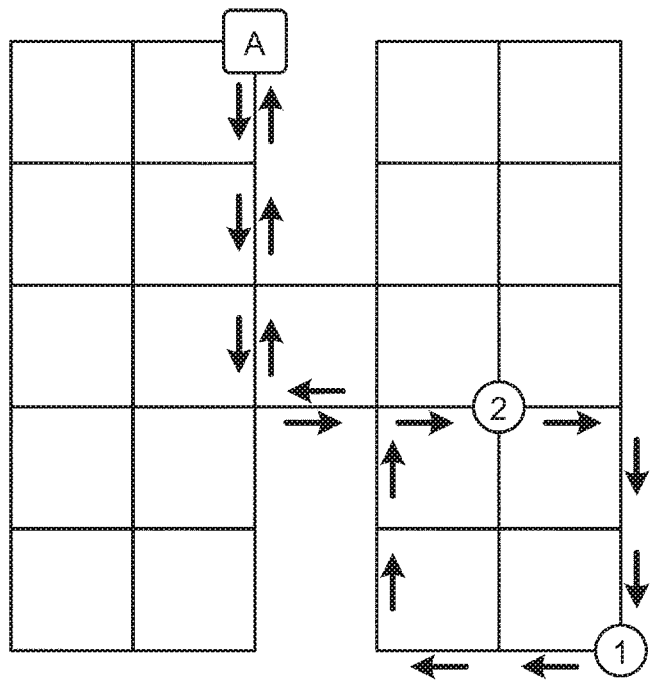

[Fig. 22]
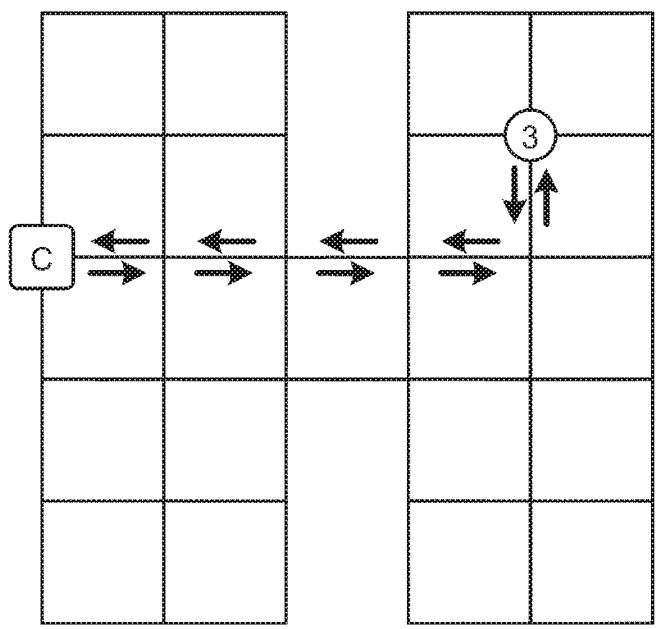
[Fig. 23]
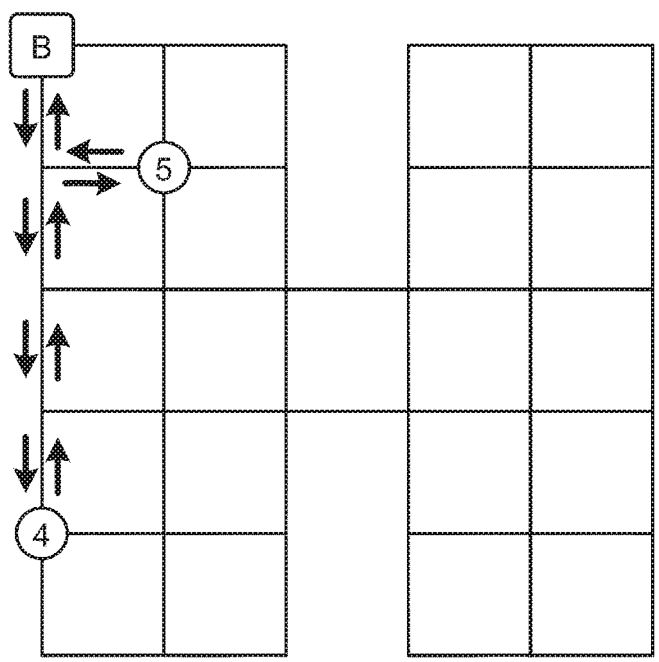
[Fig. 24]
| CART | ROUTE | DISTANCE |
|---|---|---|
| A | A→2→1→A | 16 |
| B | B→4→5→B | 10 |
| C | C→3→C | 10 |

[Fig. 25]
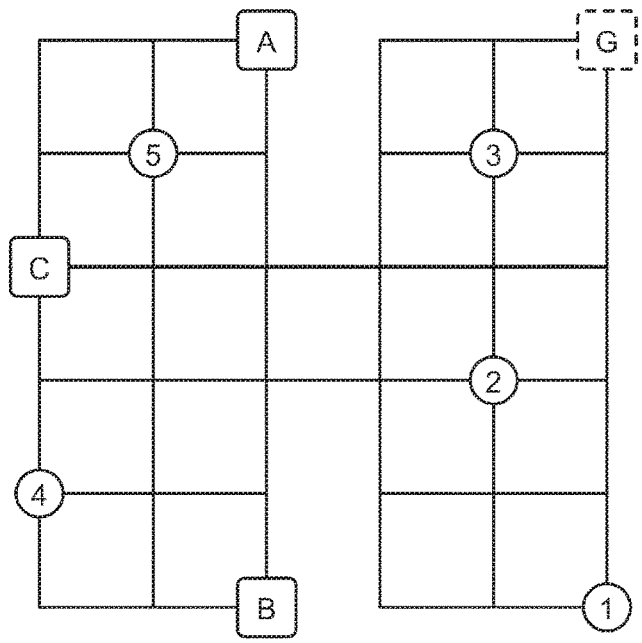
[Fig. 26]
| CART  PRODUCT | 1 | 2 | 3 | 4 | 5 |
|---|---|---|---|---|---|
| A | 8 | 5 | 5 | 6 | 2 |
| B | 7 | 4 | 6 | 3 | 5 |
| C | 8 | 5 | 5 | 2 | 2 |
[Fig. 27]
| PRODUCT | DISTANCE |
|---|---|
| 1 | 5 |
| 2 | 4 |
| 3 | 2 |
| 4 | 9 |
| 5 | 7 |
[Fig. 28]
| CART  PRODUCT | 1 | 2 | 3 | 4 | 5 |
|---|---|---|---|---|---|
| A | 13 | 9 | 7 | 15 | 9 |
| B | 12 | 8 | 8 | 12 | 12 |
| C | 13 | 9 | 7 | 11 | 9 |
| SHORTEST DISTANCE | 12 | 8 | 7 | 11 | 9 |

[Fig. 29]
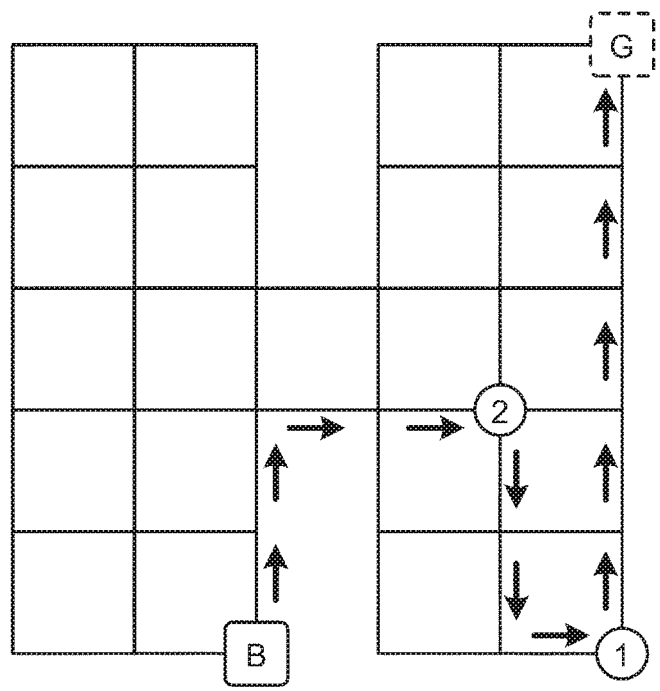
[Fig. 30]
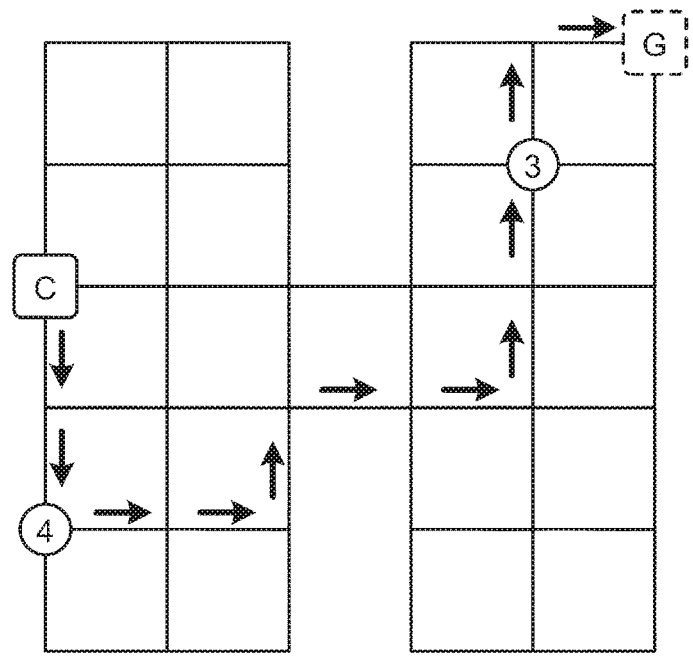

[Fig. 31]
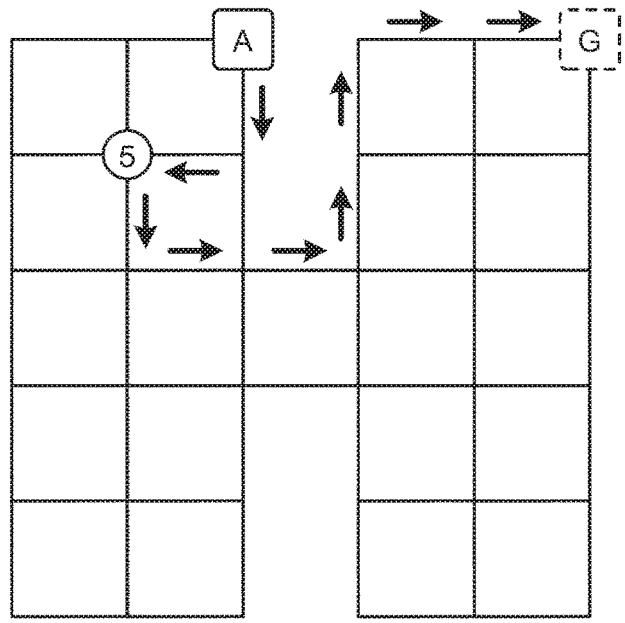
[Fig. 32]
| CART | ROUTE | DISTANCE |
|---|---|---|
| A | A→5→G | 9 |
| B | B→2→1→G | 12 |
| C | C→4→3→G | 11 |
[Fig. 33]
| PRODUCT | 1 | 2 | 3 | 4 | 5 |
|---|---|---|---|---|---|
| 1 | – | 3 | 5 | 8 | 8 |
| 2 | 3 | – | 2 | 5 | 5 |
| 3 | 5 | 2 | – | 7 | 5 |
| 4 | 8 | 5 | 7 | – | 4 |
| 5 | 8 | 5 | 5 | 4 | – |
[Fig. 34]
| CART \ PRODUCT | 1 | 2 | 3 | 4 | 5 |
|---|---|---|---|---|---|
| A |  |  |  |  | 1 |
| B |  |  |  |  | 3 |
| C |  |  |  |  | 2 |
| SHORTEST DISTANCE |  |  |  |  | 1 |

[Fig. 35]
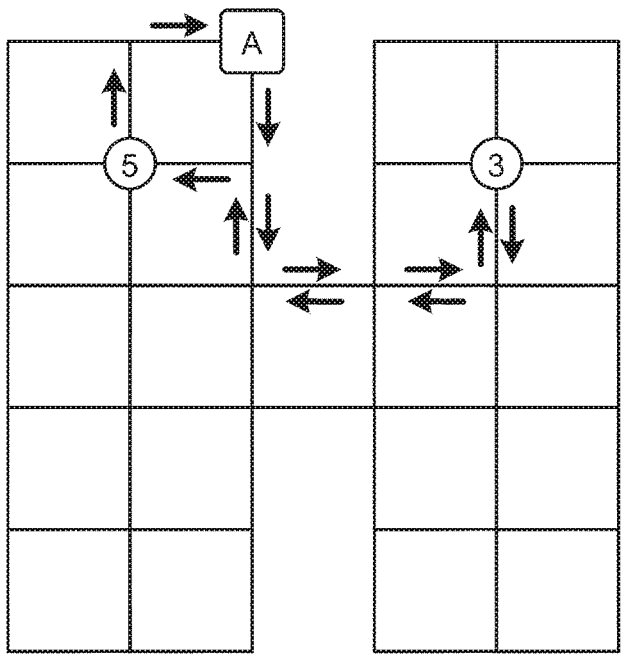
[Fig. 36]
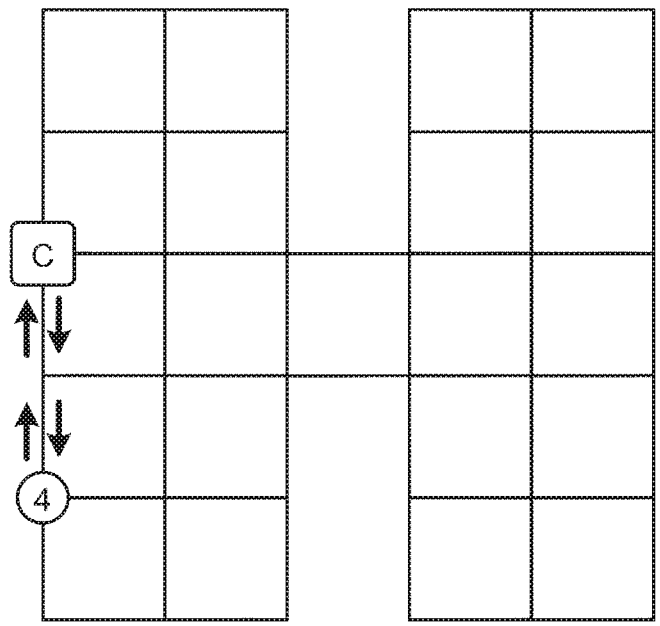
[Fig. 37]
| CART | ROUTE | DISTANCE |
|---|---|---|
| A | A→3→5→A | 12 |
| B | B→2→1→B | 14 |
| C | C→4→C | 4 |

[Fig. 38]
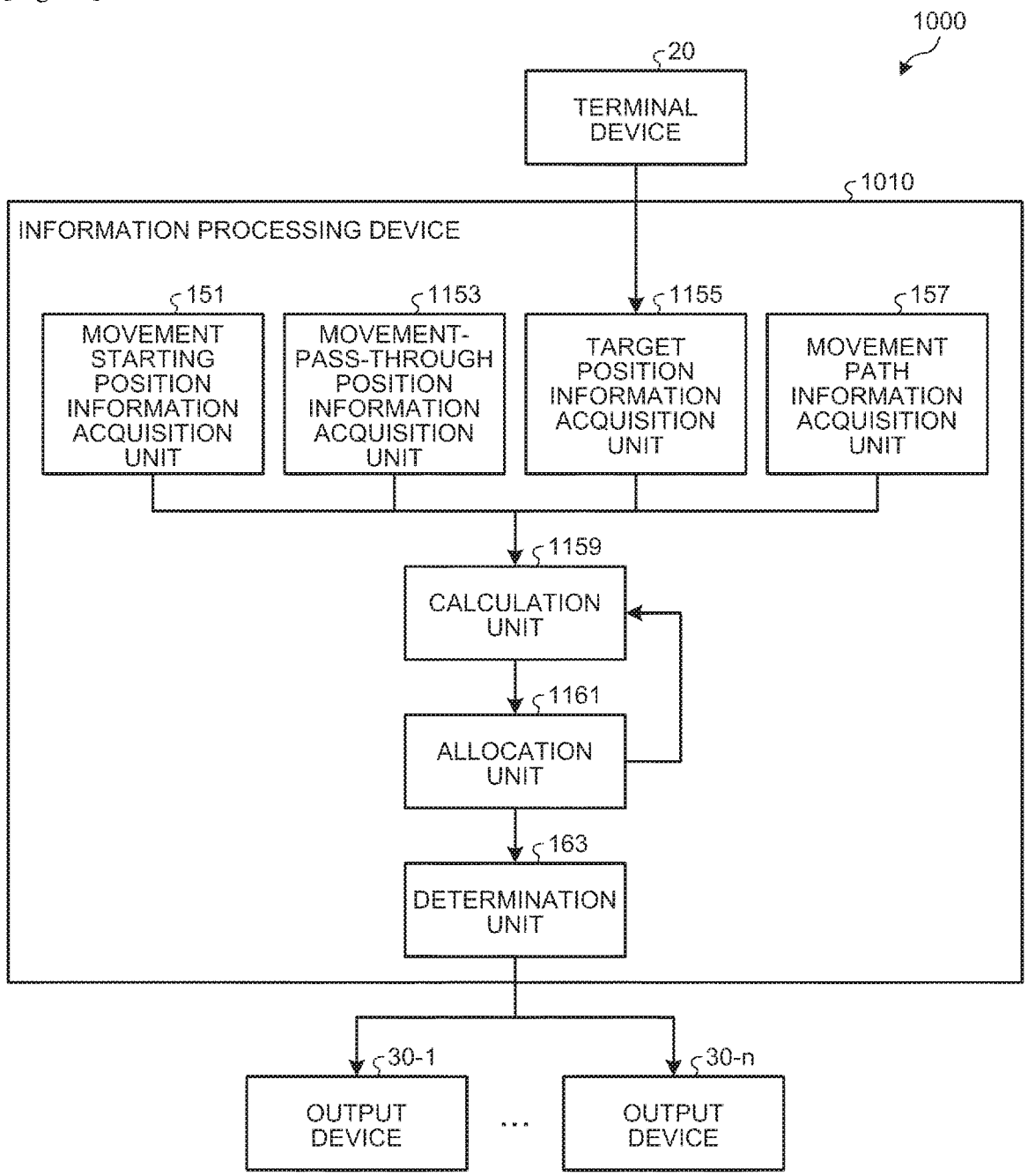

[Fig. 39]
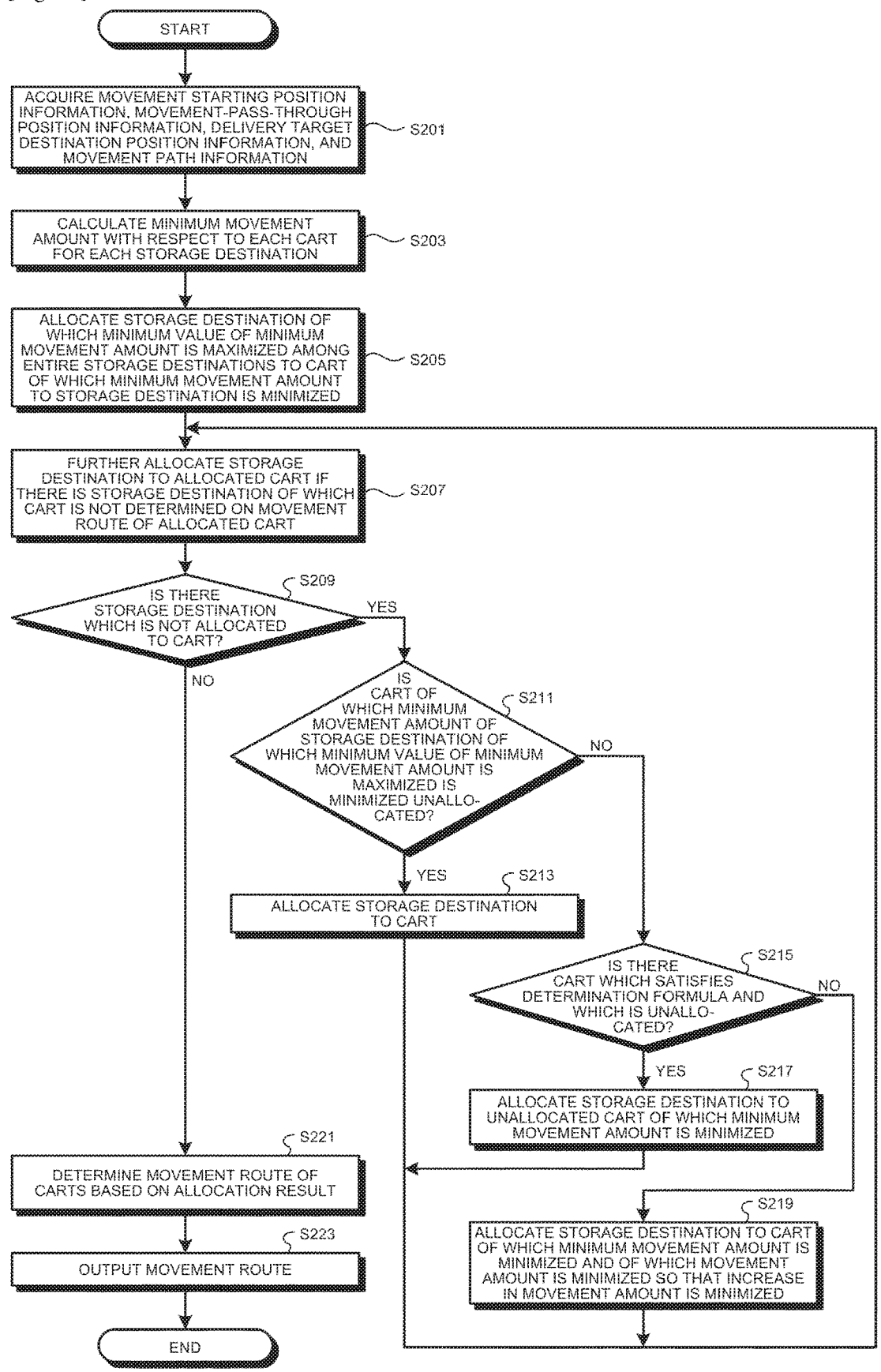

[Fig. 40]
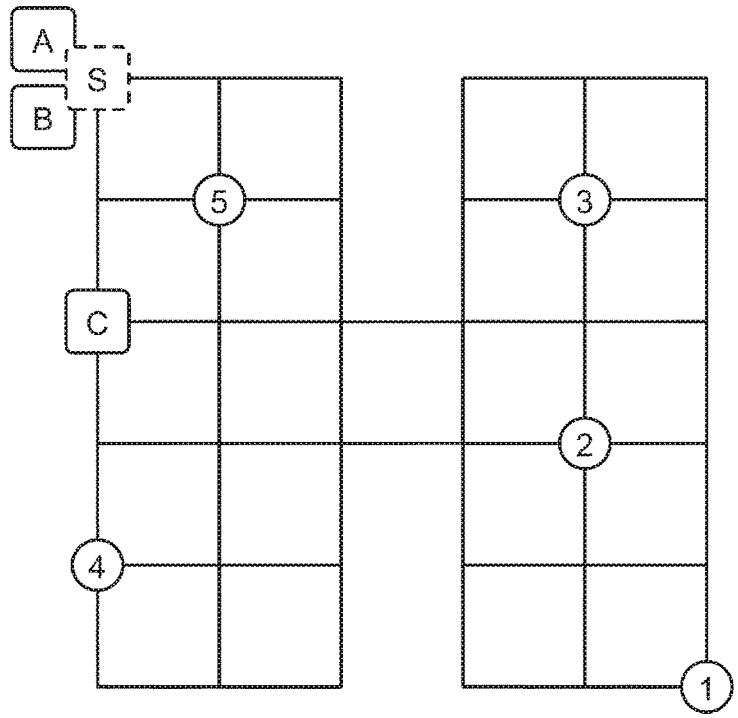
[Fig. 41]
| POINT | STORAGE DESTINATION | 1 | 2 | 3 | 4 | 5 |
|---|---|---|---|---|---|---|
| S | | 10 | 7 | 7 | 4 | 2 |
[Fig. 42]
| CART | A | B | C |
|---|---|---|---|
| A | – | 0 | 2 |
| B | 0 | – | 2 |
| C | 2 | 2 | – |
[Fig. 43]
| CART | DISTANCE |
|---|---|
| A | 0 |
| B | 0 |
| C | 2 |

[Fig. 44]
| POINT \ STORAGE DESTINATION | 1 | 2 | 3 | 4 | 5 |
|---|---|---|---|---|---|
| A | 10 | 7 | 7 | 4 | 2 |
| B | 10 | 7 | 7 | 4 | 2 |
| C | 12 | 9 | 9 | 6 | 4 |
| SHORTEST DISTANCE | 10 | 7 | 7 | 4 | 2 |
[Fig. 45]
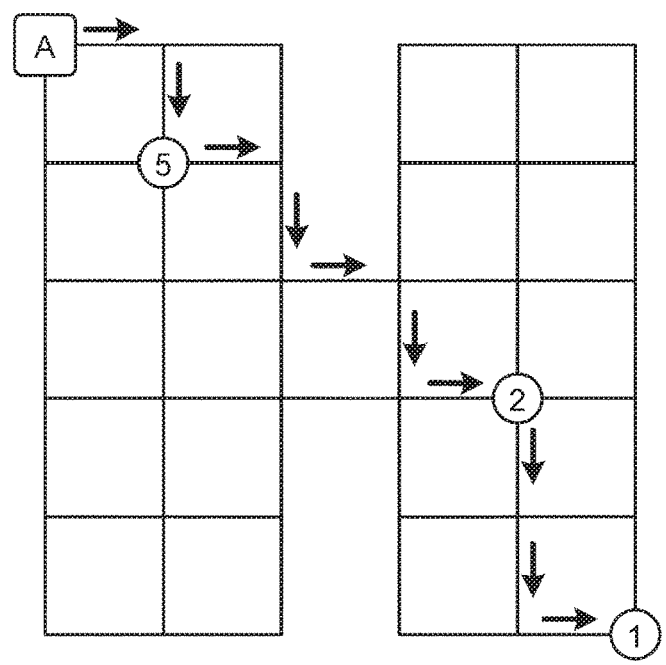
[Fig. 46]
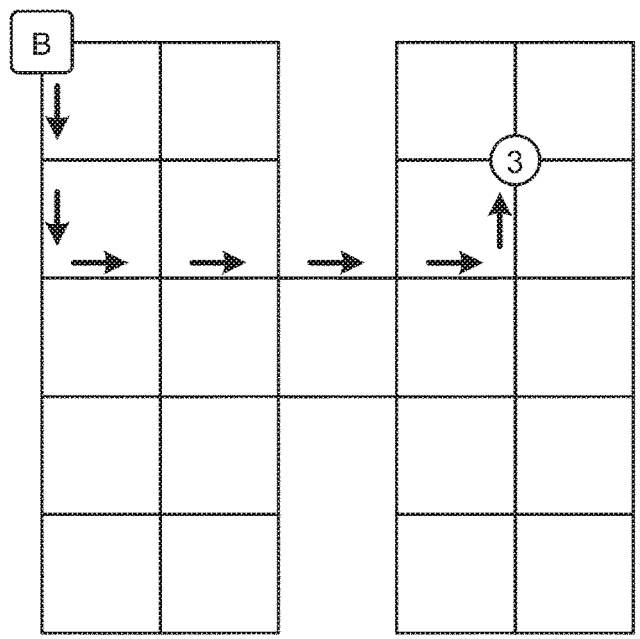

[Fig. 47]
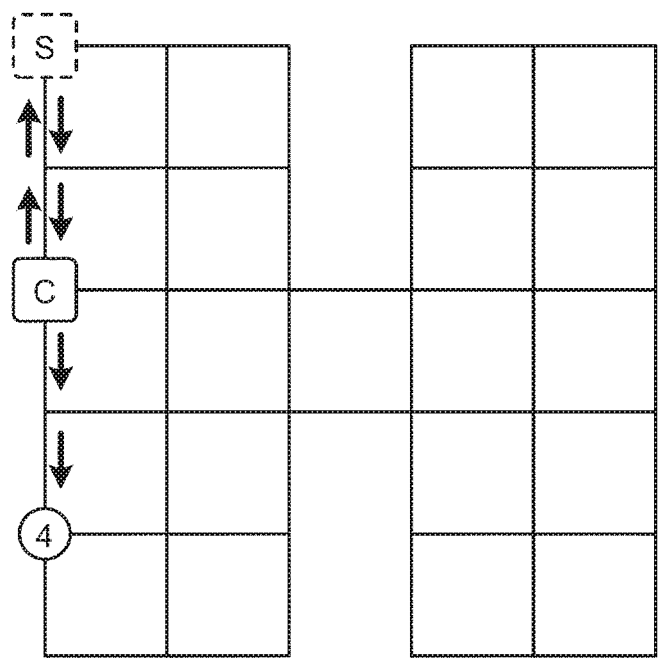
[Fig. 48]
| CART | ROUTE | DISTANCE |
|---|---|---|
| A | A→5→2→1 | 10 |
| B | B→3 | 7 |
| C | C→S→4 | 6 |

[Fig. 49]
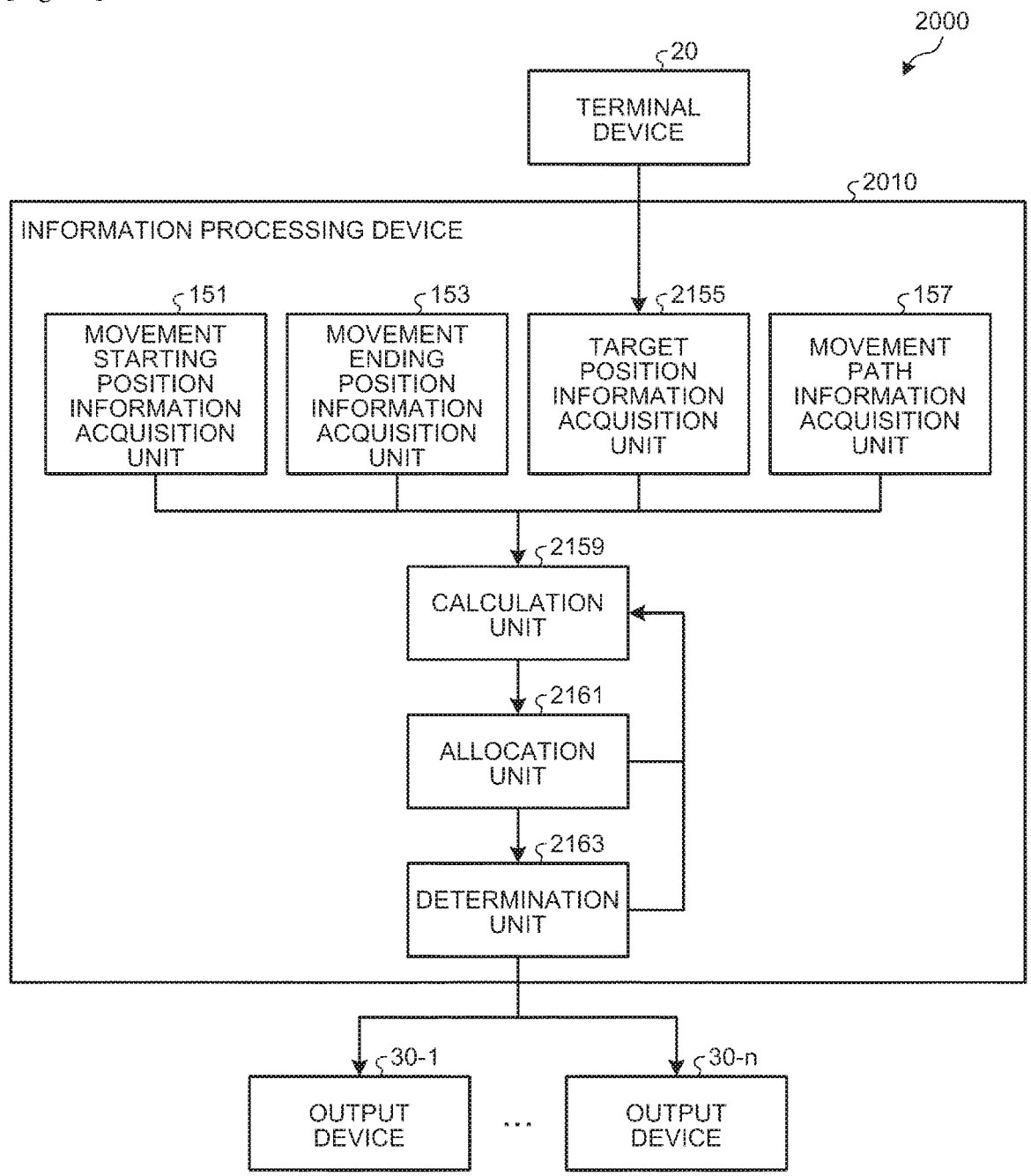

[Fig. 50]
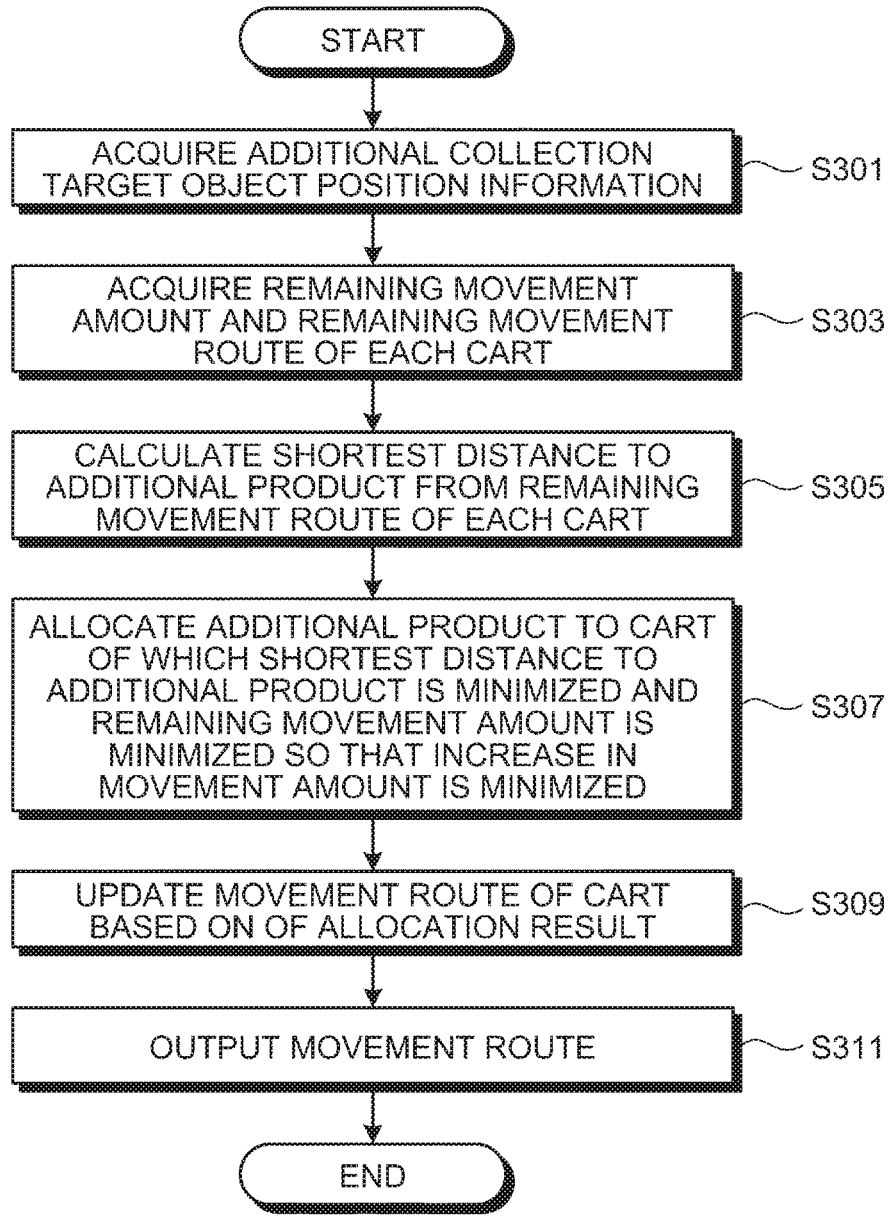

[Fig. 51]
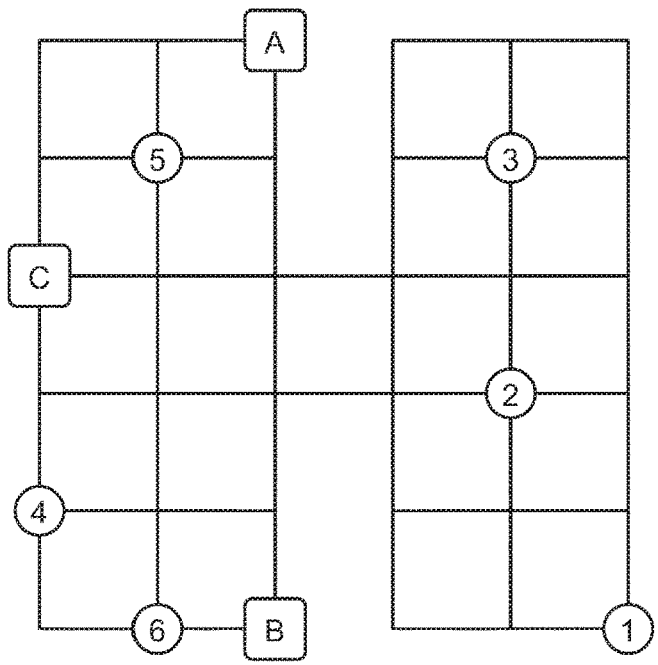
[Fig. 52]
| CART | PRODUCT | 6 |
|---|---|---|
| A | | 4 |
| B | | 1 |
| C | | 2 |
| SHORTEST DISTANCE | | 1 |
[Fig. 53]
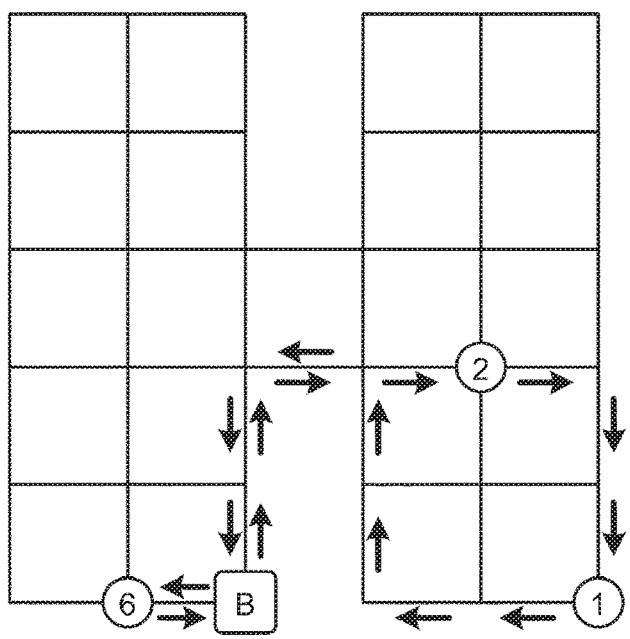

MOVEMENT ROUTE DETERMINATION METHOD AND PROGRAM

TECHNICAL FIELD

The present invention relates to a movement route determination method and program.

BACKGROUND ART

In the related art, in order to support a picking operation for picking collection target objects such as products stored in a warehouse with a moving body such as a cart, known is a method for improving work efficiency by obtaining an optimized route for picking a plurality of products to be picked by using a searching method (for example, a genetic algorithm) (for example, refer to PTL 1).

SUMMARY OF INVENTION

Technical Problem

However, in the above-described searching method, since combinations of routes (patterns that can be taken by the route) range along the factorial of the collection target objects, as the number of collection target objects increases, the number of combinations of paths also increases, so that it takes a lot of time to obtain the optimized route.

In addition, in the above-described technique in the related art, collection of a plurality of collection target objects by one moving body is considered, and collection of a plurality of collection target objects by a plurality of moving bodies is not considered. In addition, the collection of a plurality of collection target objects by a plurality of moving bodies causes the plurality of moving bodies to more greatly interfere with each other than the collection of a plurality of collection target objects by one moving body, and thus, the combination of routes increases, so that the time required for obtaining the optimized route also increases.

The present invention has been made in view of the above-described circumstances, and an object of the present invention is to provide a movement route determination method capable of suppressing a time required for determining movement routes of a plurality of moving bodies and optimizing the movement routes of the entire moving bodies and a program.

Solution to Problem

A movement route determination method according to an aspect of the present invention includes the steps of: acquiring pieces of movement starting position information indicating movement starting positions of a plurality of moving bodies, respectively; acquiring pieces of movement target destination position information indicating positions of a plurality of movement target destinations, respectively; acquiring movement path information indicating movement paths on which the plurality of moving bodies can move; calculating, for each of the plurality of moving bodies, a minimum movement amount required for the corresponding moving body to move on a movement path from the corresponding movement starting position to each of the movement target destinations, based on the plurality of pieces of movement starting position information, the plurality of pieces of movement target destination position information, and the movement path information; allocating a movement target destination that is not allocated to any one of the moving bodies to a moving body that has a minimum movement amount being the smallest of the minimum movement amounts calculated to the movement target destination and that has no allocation of any movement target destination in descending order of the smallest minimum movement amount among the plurality of movement target destinations; further allocating, when there is a movement target destination that is not allocated to the moving body on a movement route where the allocated moving body is to move to the movement target destination with the minimum movement amount, the movement target destination that is not allocated to the moving body to the allocated moving body; and determining movement routes of the plurality of moving bodies based on an allocation result.

Advantageous Effects of Invention

According to the present invention, it is possible to suppress a time required for determining movement routes of a plurality of moving bodies and optimize the movement routes of the entire moving bodies.

BRIEF DESCRIPTION OF DRAWINGS

FIG. 1 is a block diagram illustrating an example of a configuration of an information processing system according to a first embodiment.

FIG. 2 is a block diagram illustrating an example of a hardware configuration of the information processing device according to the first embodiment.

FIG. 3 is a block diagram illustrating an example of a functional configuration of the information processing device according to the first embodiment.

FIG. 4 is a flowchart illustrating an example of a movement route determination process performed in the information processing system of the first embodiment.

FIG. 5 is an explanatory diagram of a movement route determination method 1 according to the first embodiment.

FIG. 6 is an explanatory diagram of the movement route determination method 1 according to the first embodiment.

FIG. 7 is an explanatory diagram of the movement route determination method 1 according to the first embodiment.

FIG. 8 is an explanatory diagram of the movement route determination method 1 according to the first embodiment.

FIG. 9 is an explanatory diagram of the movement route determination method 1 according to the first embodiment.

FIG. 10 is an explanatory diagram of the movement route determination method 1 according to the first embodiment.

FIG. 11 is an explanatory diagram of the movement route determination method a according to the first embodiment.

FIG. 12 is an explanatory diagram of a movement route determination method 2 according to the first embodiment.

FIG. 13 is an explanatory diagram of the movement route determination method 2 according to the first embodiment.

FIG. 14 is an explanatory diagram of the movement route determination method 2 according to the first embodiment.

FIG. 15 is an explanatory diagram of the movement route determination method 2 according to the first embodiment.

FIG. 16 is an explanatory diagram of the movement route determination method 2 according to the first embodiment.

FIG. 17 is an explanatory diagram of the movement route determination method 2 according to the first embodiment.

FIG. 18 is an explanatory diagram of a movement route determination method 3 according to the first embodiment.

FIG. 19 is an explanatory diagram of the movement route determination method 3 according to the first embodiment.

FIG. 20 is an explanatory diagram of the movement route determination method 3 according to the first embodiment.

FIG. 21 is an explanatory diagram of the movement route determination method 3 according to the first embodiment.

FIG. 22 is an explanatory diagram of the movement route determination method 3 according to the first embodiment.

FIG. 23 is an explanatory diagram of the movement route determination method 3 according to the first embodiment.

FIG. 24 is an explanatory diagram of the movement route determination method 3 according to the first embodiment.

FIG. 25 is an explanatory diagram of a movement route determination method 4 according to the first embodiment.

FIG. 26 is an explanatory diagram of the movement route determination method 4 according to the first embodiment.

FIG. 27 is an explanatory diagram of the movement route determination method 4 according to the first embodiment.

FIG. 28 is an explanatory diagram of the movement route determination method 4 according to the first embodiment.

FIG. 29 is an explanatory diagram of the movement route determination method 4 according to the first embodiment.

FIG. 30) is an explanatory diagram of the movement route determination method 4 according to the first embodiment.

FIG. 31 is an explanatory diagram of the movement route determination method 4 according to the first embodiment.

FIG. 32 is an explanatory diagram of the movement route determination method 4 according to the first embodiment.

FIG. 33 is an explanatory diagram of a movement route determination method 5 according to the first embodiment.

FIG. 34 is an explanatory diagram of a movement route determination method 6 according to the first embodiment.

FIG. 35 is an explanatory diagram of the movement route determination method 6 according to the first embodiment.

FIG. 36 is an explanatory diagram of the movement route determination method 6 according to the first embodiment.

FIG. 37 is an explanatory diagram of the movement route determination method 6 according to the first embodiment.

FIG. 38 is a block diagram illustrating an example of a functional configuration of an information processing device according to a second embodiment.

FIG. 39 is a flowchart illustrating an example of a movement route determination process performed in the information processing system of the second embodiment.

FIG. 40 is an explanatory diagram of a movement route determination method according to the second embodiment.

FIG. 41 is an explanatory diagram of the movement route determination method according to the second embodiment.

FIG. 42 is an explanatory diagram of the movement route determination method according to the second embodiment.

FIG. 43 is an explanatory diagram of the movement route determination method according to the second embodiment.

FIG. 44 is an explanatory diagram of the movement route determination method according to the second embodiment.

FIG. 45 is an explanatory diagram of the movement route determination method according to the second embodiment.

FIG. 46 is an explanatory diagram of the movement route determination method according to the second embodiment.

FIG. 47 is an explanatory diagram of the movement route determination method according to the second embodiment.

FIG. 48 is an explanatory diagram of the movement route determination method according to the second embodiment.

FIG. 49 is a block diagram illustrating an example of a functional configuration of an information processing device according to a third embodiment.

FIG. 50 is a flowchart illustrating an example of a movement route determination process performed in the information processing system of the third embodiment.

FIG. 51 is an explanatory diagram of a movement route updating method according to the third embodiment.

FIG. 52 is an explanatory diagram of the movement route updating method according to the third embodiment.

FIG. 53 is an explanatory diagram of the movement route updating method according to the third embodiment.

DESCRIPTION OF EMBODIMENTS

Hereinafter, embodiments of movement route determination method and program according to the present invention will be described in detail with reference to the accompanying drawings.

First Embodiment

In a first embodiment, a movement route determination method suitable for collecting a plurality of collection target objects by a plurality of moving bodies will be described. In addition, in the first embodiment, the plurality of collection target objects are a plurality of products stored in a distributive manner in a warehouse, and the plurality of moving bodies are carts arranged in a distributive manner in the warehouse to collect (pick) the plurality of products. A case where a picking operation for picking a plurality of products stored in a warehouse with a plurality of carts is described as an example, but the present invention is not limited thereto. In the first embodiment, a case where each cart is manually moved by a user is described as an example, but the present invention is not limited thereto. The cart may be autonomously moved automatically.

FIG. 1 is a block diagram illustrating an example of a configuration of an information processing system 1 according to the first embodiment. As illustrated in FIG. 1, the information processing system 1 is configured to include an information processing device 10, a terminal device 20, and output devices 30-1 to 30-n (n is a natural number of 2 or more). The information processing device 10, the terminal device 20, and the output devices 30-1 to 30-n are connected via a network 2. The network 2 can be realized by, for example, the Internet, a local area network (LAN), or the like. In addition, in the following description, in a case where it is not necessary to distinguish the output devices 30-1 to 30-n, the output devices may be simply referred to as the output device 30.

The information processing device 10 determines a movement route suitable for collecting a plurality of collection target objects by a plurality of moving bodies and can be realized by, for example, one or more computers.

FIG. 2 is a block diagram illustrating an example of a hardware configuration of the information processing device 10 according to the first embodiment. The information processing device 10 is configured to include a control device 101 such as a central processing unit (CPU) or a graphics processing unit (GPU), a main storage device 102 such as a read only memory (ROM) or a random access memory (RAM), an auxiliary storage device 103 such as a hard disk drive (HDD) or a solid state drive (SSD), a display device 104 such as a display, an input device 105 such as a keyboard or a mouse, and a communication device 106 such as a communication interface, and thus, the information processing device has a hardware configuration using a general computer.

The terminal device 20 designates a plurality of collection target objects to be collected to the information processing device 10, and examples thereof include a personal computer (PC) and a smart terminal.

The output device 30 outputs a movement route determined by the information processing device 10. In addition, in the first embodiment, each output device 30 is associated with a moving body, and outputs a movement route for the moving body. Examples of the output device 30 include a display and a speaker provided in the moving body and a smart terminal possessed by a user moving the moving body. In addition, the output of the movement route may be performed in any output mode such as display output, sound output, projection output, print output, and the like.

FIG. 3 is a block diagram illustrating an example of a functional configuration of the information processing device 10 according to the first embodiment. As illustrated in FIG. 3, the information processing device 10 is configured to include a movement starting position information acquisition unit 151, a movement ending position information acquisition unit 153, a target position information acquisition unit 155, a movement path information acquisition unit 157, a calculation unit 159, an allocation unit 161, and a determining unit 163.

The movement starting position information acquisition unit 151 and the determining unit 163 can be realized by, for example, the control device 101, the main storage device 102, the communication device 106, and the like. The movement ending position information acquisition unit 153, the target position information acquisition unit 155, the movement path information acquisition unit 157, the calculation unit 159, and the allocation unit 161 can be realized by, for example, the control device 101 and the main storage device 102.

The movement path information acquisition unit 157 acquires movement path information indicating a movement path on which a plurality of moving bodies can move. In the first embodiment, the movement path indicated by the movement path information is a movement passage in the warehouse and will be described by exemplifying the case of a route connecting points on the network as illustrated in FIG. 5, but the present invention is not limited thereto. In addition, in the movement path illustrated in FIG. 5, it is assumed that the distance of one mass is 1 and the time required for moving one mass is uniform regardless of which one of the masses the moving body travels. Namely, it is assumed that the speed of the moving body moving on the movement path illustrated in FIG. 5 is fixed at a constant speed.

In addition, the movement path information acquisition unit 157 may acquire the movement path information from the outside or may obtain the movement path information from the auxiliary storage device 103 or the like.

The movement starting position information acquisition unit 151 acquires the movement starting position information indicating the movement starting position of the moving body for each of the plurality of moving bodies. In the first embodiment, the movement starting position indicated by the movement starting position information indicates the position of the moving body existing on the movement path indicated by the movement path information, and examples thereof include any point on the movement path illustrated in FIG. 5. In addition, in FIG. 5, the moving bodies (carts) are represented by "A", "B", and "C". In addition, the movement starting position information may be two-dimensional coordinate information indicating a corresponding point on the movement path or may be identification information (for example, a point ID) for identifying the corresponding point.

In addition, the movement starting position of each moving body may be specified by using, for example, an IC tag (more specifically, an RFID is provided for each moving body, and the RFID) is detected by an RFID reader installed at each point in the warehouse, so that the movement starting position of each moving body is specified) may be specified by image recognition (more specifically, a position of each moving body on the image is converted into a position in the warehouse, so that the movement starting position of each moving body is specified), or may be specified by using global positioning system (GPS). Since these techniques are well-known in the art, detailed description thereof will be omitted.

The movement ending position information acquisition unit 153 acquires movement ending position information indicating movement ending positions of a plurality of moving bodies. In the first embodiment, the movement ending position indicated by the movement ending position information indicates any position on the movement path indicated by the movement path information, and examples thereof include any point on the movement path illustrated in FIG. 5. The movement ending position may be the same as the movement starting position or may be a position different from the movement starting position. In a case where the movement ending position is different from the movement starting position, for example, the movement ending position may be specified on the movement path information (for example, on the movement path illustrated in FIG. 5) acquired by the movement path information acquisition unit 157. In addition, the movement ending position information may be two-dimensional coordinate information indicating a corresponding point on the movement path or may be identification information (for example, a point ID) for identifying the corresponding point.

The target position information acquisition unit 155 acquires collection target object position information indicating a position of a collection target object for each of the plurality of collection target objects that are to be collected by the plurality of moving bodies. In the first embodiment, as described above, a plurality of collection target objects to be collected are designated from the terminal device 20. For example, the terminal device 20 gives notice of the identification information (for example, a product ID) of each of the plurality of collection target objects to be collected, so that the target position information acquisition unit 155 specifies the plurality of collection target objects to be collected.

In addition, in the first embodiment, collection target object position management information associated with the identification information of the collection target object and collection target object position information indicating the position on the warehouse where the collection target object indicated by the identification information of the collection target object (in detail, any position on the movement path indicated by the movement path information, and examples thereof include any point on the movement path illustrated in FIG. 5) is stored in the auxiliary storage device 103. Then, the target position information acquisition unit 155 acquires a plurality of collection target object position information of each of the plurality of collection target objects by acquiring the collection target object position management information associated with the identification information of the collection target object notice of which is given by the terminal device 20 from the collection target object position management information. In addition, in FIG. 5, the collection target objects (products) are represented by "1", "2", "3", "4", and "5".

In addition, similarly to the case of the movement starting position of each moving body, the position of each collection target object may be specified by using an IC tag, may be specified by image recognition or may be specified by using GPS.

The calculation unit 159 calculates the minimum movement amount required for the moving body to move on the movement path to collect the collection target object from the movement starting position and reach the movement ending position on the basis of a plurality of pieces of movement starting position information acquired by the movement starting position information acquisition unit 151, movement ending position information acquired by the movement ending position information acquisition unit 153, a plurality of pieces of collection target object position information acquired by the target position information acquisition unit 155 and the movement path information acquired by the movement path information acquisition unit 157 for each of a plurality of moving bodies for each collection target object. In the first embodiment, a case where the minimum movement amount and the later-described movement amount are distances will be described as an example, but the present invention is not limited thereto, and the minimum movement amount and the movement amount may be time.

In addition, when the movement starting position and the movement ending position are the same position, the calculation unit 159 does not use the movement ending position information and calculates the minimum movement amount as the movement amount required for the moving body to move on the movement path from the movement starting position until collecting the collection target object.

In addition, the minimum movement amount may be calculated by using a well-known technique such as a Dijkstra method or an A* star method. In addition, in a case where a plurality of movement routes with the minimum movement amount exist, the calculation unit 159 obtains the entire movement routes.

The allocation unit 161 allocates the collection target objects that are not allocated to the collecting moving body among the plurality of collection target objects, in descending order of the minimum values of the minimum movement amount of the collection target objects, to the moving body of which the minimum movement amount required to collect the collection target object is minimized and to which no collection target object is allocated among the plurality of moving bodies and, if there are the collection target objects that are not allocated to the collecting moving body on the movement route where the allocated moving body is to collect the collection target object with the minimum movement amount and is to reach the movement ending position with the minimum movement amount (in the case of not using the movement ending position information, on the movement route where the allocated moving body is to collect the collection target object with the minimum movement amount), the allocation unit further allocates the collection target objects that are not allocated to the collecting moving body to the allocated moving body.

In addition, in a case where there is no moving body of which the minimum movement amount required for collection of the collection target object is minimized and to which no collection target object is allocated, if there are one or more moving bodies which satisfy the determination formula for determining a degree of variation and to which no collection target object is allocated, the allocation unit 161 allocates the collection target object to the moving body of which the minimum movement amount required to collect the collection target object is minimized among the one or more moving bodies.

As the determination formula for determining a degree of variation, (the minimum movement amount of the moving body X and the collection target object Q)=(the distance between the moving body X and the moving body Y)+(the minimum movement amount of the moving body Y and the collection target object Q) but the present invention is not limited thereto. In addition, the moving body X is a moving body to be determined as to whether or not to satisfy the determination formula, the collection target object Q is a collection target object to be allocated and the moving body Y is an arbitrary moving body.

In a case where the above-described determination formula is satisfied, it is determined that the arrangement of the moving body X and the moving body Y is local, and it is recognized that the moving body X and the moving body Y are included in a group. In this case, since the collection target object Q is allocated not to the moving body Y but to the moving body X, it is possible to prevent the collection target object from being allocated preferentially to the moving body Y.

In addition, in a case where there is no moving body of which the minimum movement amount required to collect the collection target object is minimized and to which no collection target object is allocated and, furthermore, there is no moving body which satisfies the determination formula for determining a degree of variation and to which no collection target object is allocated, the allocation unit 161 may allocate the collection target object to the moving body of which the minimum movement amount required to collect the collection target object is minimized and of which the movement amount is minimized among the plurality of moving bodies.

In addition, in a case where there is no moving body of which the minimum movement amount required to collect the collection target object is minimized and to which no collection target object is allocated and, furthermore, there is no moving body which satisfies the determination formula for determining a degree of variation and to which no collection target object is allocated, the allocation unit 161 may allocate the collection target object to the moving body which collects the collection target object having the shortest distance from the collection target object on the movement path.

In addition, in a case where there is no moving body of which the minimum movement amount required to collect the collection target object is minimized and to which no collection target object is allocated and, furthermore, there is no moving body which satisfies the determination formula for determining a degree of variation and to which no collection target object is allocated, the allocation unit 161 may allocate the collection target object to the moving body of which the movement amount is minimized among one or more moving bodies closest to the collection target object on the movement path.

In addition, in a case where there is no moving body of which the minimum movement amount required to collect the collection target object is minimized and to which no collection target object is allocated and, furthermore, there is no moving body which satisfies the determination formula for determining a degree of variation and to which no collection target object is allocated, the allocation unit 161 may allocate the collection target object to a cart by using a searching method (genetic algorithm) as disclosed in PTL 1.

In addition, the allocation unit 161 allocates the collection target object to the moving body of which the movement amount is minimized so that the increase in the movement amount of the moving body of which the movement amount is minimized is minimized.

The determining unit 163 determines the movement routes of the plurality of moving bodies on the basis of the plurality of pieces of movement starting position information acquired by the movement starting position information acquisition unit 151, the movement ending position information acquired by the movement ending position information acquisition unit 153, the plurality of pieces of collection target object position information acquired by the target position information acquisition unit 155, and the movement path information acquired by the movement path information acquisition unit 157. Specifically, the determining unit 163 determines the movement routes of the plurality of moving bodies on the basis of the allocation result of the allocation unit 161, and transmits the movement route information indicating the movement route of the moving body to the output device 30 associated with the moving body for each moving body.

Each output device 30 outputs a movement route indicated by the movement route information transmitted from the information processing device 10.

FIG. 4 is a flowchart illustrating an example of a movement route determination process performed by the information processing system 1 according to the first embodiment. In addition, in the flowchart illustrated in FIG. 4, a case where the moving body is a cart and the collection target object is a product will be described as an example.

First, prior to determining the movement route, the movement starting position information acquisition unit 151 acquires the movement starting position information of each of the plurality of carts, the movement ending position information acquisition unit 153 acquires the movement ending position information of the plurality of carts, the target position information acquisition unit 155 acquires the collection target object position information of each of the plurality of products collected by the plurality of carts, and the movement path information acquisition unit 157 acquires the movement path information (Step S101). In addition, in a case where it is known in advance that the movement starting position and the movement ending position of the cart are the same, the acquisition of the movement ending position information of the plurality of carts by the movement ending position information acquisition unit 153 may be omitted.

Subsequently, the calculation unit 159 calculates the minimum movement amount required for the cart to move on the movement path to collect the product from the movement starting position until reaching the movement ending position on the basis of the plurality of pieces of movement starting position information acquired by the movement starting position information acquisition unit 151, the movement ending position information acquired by the movement ending position information acquisition unit 153, the plurality of pieces of collection target object position information acquired by the target position information acquisition unit 155, and the movement path information acquired by the movement path information acquisition unit 157, for each of the plurality of carts, for each product (Step S103). In addition, in a case where the movement starting position and the movement ending position are the same position, the calculation unit 159 may not use the movement ending position information and may calculate the minimum movement amount as the movement amount required to move the cart on the movement path from the movement starting position until the product is collected.

Subsequently, the allocation unit 161 allocates the product of which the minimum value of the minimum movement amount is maximized among the plurality of products to the cart of which the minimum movement amount required to collect the product is minimized among the plurality of carts (Step S105).

Subsequently, if there are the products that are not allocated to the collecting cart on the movement route where the allocated cart is to collect the product with the minimum movement amount and is to reach the movement ending position with the minimum movement amount (in the case of not using the movement ending position information, on the movement route where the allocated cart is to collect the product with the minimum movement amount), the allocation unit 161 further allocates the products that are not allocated to the collecting cart to the allocated cart (Step S107).

Subsequently, in a case where there are remaining products that are not allocated to the collecting cart (Yes in Step S109), if the cart of which the minimum movement amount required to collect the product of which the minimum value of the minimum movement amount is maximized among the one or more remaining products is minimized is unallocated (Yes in Step S111), the allocation unit 161 allocates the product of which the minimum value of the minimum movement amount is maximized to the cart (Step S5113). Then, the process returns to Step S107.

On the other hand, in a case where the cart of which the minimum movement amount required to collect the product of which the minimum value of the minimum movement amount is maximized among the one or more remaining products is minimized is not unallocated (No in Step S111), if there are one or more carts which satisfy the determination formula for determining a degree of variation and to which no product is allocated (Yes in Step S115), the allocation unit 161 allocates the product of which the minimum value of the minimum movement amount is maximized to the cart of which the minimum movement amount required to collect the product of which the minimum value of the minimum movement amount is maximized is minimized among the one or more carts (Step S117). Then, the process returns to Step S107.

In addition, if there are no one or more carts which satisfy the determination formula for determining a degree of variation and to which no product is allocated (No in Step S115), the allocation unit 161 allocates the product of which the minimum value of the minimum movement amount is maximized to the cart of which the minimum movement amount required to collect the product of which the minimum value of the minimum movement amount is maximized among one or more remaining products is minimized and of which the movement amount is minimized among the plurality of carts so that the increase in the movement amount is minimized (Step S119). Hereinafter, this allocation method may be referred to as an "allocation method 1". Then, the process returns to Step S107.

In addition, with respect to the process of Step S119, the product of which the minimum value of the minimum movement amount is maximized may be allocated to the cart which collects the product having the shortest distance on the movement path from the product of which the minimum value of the minimum movement amount is maximized among the one or more remaining products, so that the increase in the movement amount is minimized. Hereinafter, this allocation method may be referred to as an "allocation method 2".

In addition, with respect to the process of Step S119, the product of which the minimum value of the minimum movement amount is maximized may be allocated to the chart of which the movement amount is minimized among the one or more carts closest on the movement path to the product of which the minimum value of the minimum movement amount is maximized among the one or more remaining products so that the increase in the movement amount is minimized. Hereinafter, this allocation method may be referred to as an "allocation method 3".

In Step S109, in a case where no product which is not allocated to the collecting cart remains (No in Step S109), the determining unit 163 determines the movement routes of a plurality of carts on the basis of the allocation result of the allocation unit 161 and transmits the movement route information indicating the movement route of the cart to the output device 30 associated with the cart for each cart (Step S121).

Subsequently, each output device 30 outputs the movement route indicated by the movement route information transmitted from the information processing device 10 (Step S123). Therefore, the user who is to move the cart associated with the output device 30 can check the movement route which is optimized for the cart and can move the cart with the optimized movement route.

Hereinafter, a movement route determination method for a plurality of carts will be described by using specific examples.

Movement Route Determination Method 1

First, a movement route determination method for a plurality of carts in the state illustrated in FIG. 5 will be described.

In the example illustrated in FIG. 5, "A", "B", and "C" represent carts, and "1", "2", "3", "4", and "5" represent products collected by the carts. In addition, the movement path through which the cart can move is represented by a network, and the movement starting position and the movement ending position of the cart are assumed to be the same position. These are specified on the basis of the plurality of pieces of movement starting position information acquired by the movement starting position information acquisition unit 151, the movement ending position information acquired by the movement ending position information acquisition unit 153, the plurality of pieces of collection target object position information acquired by the target position information acquisition unit 155, and the movement path information acquired by the movement path information acquisition unit 157.

Namely, a movement route determination method from the time when the carts "A", "B" and "C" collect (pick) the products "1", "2", "3", "4", and "5" until returning to the original position in the state illustrated in FIG. 5 will be described.

In the movement route determination method for the carts "A", "B", and "C" in the state illustrated in FIG. 5, in a case where there are a plurality of carts of which the minimum movement amount (minimum movement distance) is minimized, the processes are performed in the alphabetical order. Similarly, in a case where there are a plurality of products of which the minimum value (shortest distance) of the minimum movement amount is maximized, the processes are performed in ascending numerical order. In addition, in the movement route determination method for the carts "A". "B" and "C" in the state illustrated in FIG. 5, the afore-described "allocation method 1" is adopted in Step S119 of the flowchart illustrated in FIG. 4.

First, as illustrated in FIG. 6, the calculation unit 159 calculates the minimum movement amount for each of the plurality of carts for each product. In addition, as illustrated in FIG. 7, the calculation unit 159 also calculates the shortest distance between the carts. In addition, the shortest distance between the carts illustrated in FIG. 7 is used in the determination formula for determining a degree of variation, so that the shortest distance is not used in a case where there is no need to use the determination formula.

Subsequently, since the product of which the minimum value of the minimum movement amount is maximized among the plurality of products is the product "1" (refer to FIG. 6), the allocation unit 161 allocates the product "1" to the cart "B" (refer to FIG. 6) of which the minimum movement amount required to collect the product "1" is minimized (Step S105). In addition, since the product "2" exists on the movement route where the cart "B" is to collect the product "1" with the minimum movement amount (refer to FIG. 5) and the product "2" is not allocated with the cart, the allocation unit 161 further allocates the product "2" to the cart "B" (Step S107).

Subsequently, in a case where the products "3", "4", and "5" are unallocated (Yes in Step S109), since the cart "A" (refer to FIG. 6) of which the minimum movement amount required to collect the product "3" (refer to FIG. 6) of which the minimum value of the minimum movement amount is maximized among the products "3", "4", and "5" is minimized is unallocated (Yes in Step S111), the allocation unit 161 allocates the product "3" to the cart "A" (Step S113).

Subsequently, in a case where the products "4" and "5" are unallocated (Yes in Step S109), since the cart "C" of which the minimum movement amount required to collect the product "4" (refer to FIG. 6) of which the minimum value of the minimum movement amount is maximized among the products "4" and "5" is minimized is unallocated (Yes in Step S111), the allocation unit 161 allocates the product "4" to the cart "C" (Step S113).

Subsequently, the product "5" is unallocated (Yes in Step S109), the carts "A" and "C" of which the minimum movement amount required to collect the product "5" is minimized are not unallocated (No in Step S111), and no unallocated cart remains (No in Step S115). Herein, among the carts "A", "B", and "C", the carts of which the minimum movement amount required to collect the product "5" is minimized are "A" and "C" (refer to FIG. 6). In addition, the movement amount required to collect the product of the cart "A" at this point is 5, the movement amount required to collect the product of the cart "B" is 7, and the movement amount required to collect the product of the cart "C" is 2. Therefore, the allocation unit 161 allocates the product "5" to the cart "C" so that the increase in the movement amount is minimized (Step S119). In addition, even if the movement route with the minimum movement amount for collecting the product "4" by the cart "C" and the movement route with the minimum movement amount for collecting the product "5" are combined, since a portion of the route cannot be reduced, in this case, it is enough to allocate the product "5" to the cart "C".

From the above-described allocation result, the determining unit 163, for example, determines the movement route of the cart "B" as the movement route illustrated in FIG. 8, determines the movement route of the cart "A" as the movement route illustrated in FIG. 9, and determines the movement route of the cart "C" as the movement route illustrated in FIG. 10 (Step S121). In addition, since the movement starting position and the movement ending position of each cart are the same position as described above, in FIGS. 8 to 10, the movement route is determined so that the final movement amount required to collect the products of each cart is doubled, and after collecting the products, the cart returns to the movement ending position. As a result, the movement route and the movement distance of each cart are as illustrated in FIG. 11, and the movement routes in the entire carts are optimized.

Movement Route Determination Method 2

Next, a movement route determination method for a plurality of carts in the state illustrated in FIG. 12 will be described.

In the example illustrated in FIG. 12, "A" and "B" represent carts, and "1", "2", "3", "4", and "5" represent products collected by the carts. In addition, the movement path through which the cart can move is represented by a network, and the movement starting position and the movement ending position of the cart are assumed to be the same position.

Namely, a movement route determination method from the time when the carts "A" and "B" collect (pick) the products "1", "2", "3", "4", and "5" until returning to the original position in the state illustrated in FIG. 12 will be described.

In the movement route determination method for the carts "A" and "B" in the state illustrated in FIG. 12, in a case where there are a plurality of carts of which the minimum movement amount is minimized, the processes are performed in the alphabetical order. Similarly, in a case where there are a plurality of products of which the minimum value of the minimum movement amount is maximized, the processes are performed in ascending numerical order. In addition, in the movement route determination method for the carts "A" and "B" in the state illustrated in FIG. 12, the afore-described "allocation method 1" is adopted in Step S119 of the flowchart illustrated in FIG. 4.

First, as illustrated in FIG. 13, the calculation unit 159 calculates the minimum movement amount for each of the plurality of carts for each product. In addition, as illustrated in FIG. 14, the calculation unit 159 also calculates the shortest distance between the carts. In addition, the shortest distance between the carts illustrated in FIG. 14 is used in the determination formula for determining a degree of variation, so that the shortest distance is not used in a case where there is no need to use the determination formula.

Subsequently, since the product of which the minimum value of the minimum movement amount is maximized among the plurality of products is the product "1" (refer to FIG. 13), the allocation unit 161 allocates the product "1" to the cart "B" (refer to FIG. 13) of which the minimum movement amount required to collect the product "1" is minimized (Step S105). In addition, since the product "2" exists on the movement route where the cart "B" is to collect the product "1" with the minimum movement amount (refer to FIG. 12) and the product "2" is not allocated with the cart, the allocation unit 161 further allocates the product "2" to the cart "B" (Step S107).

Subsequently, in a case where the products "3", "4", and "5" are unallocated (Yes in Step S109), since the cart "A" (refer to FIG. 13) of which the minimum movement amount required to collect the product "3" (refer to FIG. 13) of which the minimum value of the minimum movement amount is maximized among the products "3", "4", and "5" is minimized is unallocated (Yes in Step S111), the allocation unit 161 allocates the product "3" to the cart "A" (Step S113).

Subsequently, the products "4" and "5" are unallocated (Yes in Step S109), the cart "B" of which the minimum movement amount required to collect the product "4" (refer to FIG. 13) of which the minimum value of the minimum movement amount is maximized among the products "4" and "5" is minimized is not unallocated (No in Step S111), and no unallocated cart remains (No in Step S115). Herein, among the carts "A" and "B", the cart of which the minimum movement amount required to collect the product "4" is minimized is "B" (refer to FIG. 13). In addition, the movement amount required to collect the product of the cart "A" at this point is 5, and the movement amount required to collect the product of the cart "B" is 7. Therefore, the allocation unit 161 allocates the product "4" to the cart "B" so that the increase in movement amount is minimized (Step S119). In addition, if the movement route with the minimum movement amount for collecting the product "4" by the cart "B" and the movement route with the minimum movement amount for collecting the product "1" and "2" are combined, since a portion of the route (route corresponding to one movement amount) can be reduced, in this case, the product "4" is allocated to the cart "B", and the fact that the reducible route is reduced is set.

Subsequently, the product "5" is unallocated (Yes in Step S109), the cart "A" of which the minimum movement amount required to collect the product "5" is minimized is not unallocated (No in Step S111), and no unallocated cart remains (No in Step S115). Herein, among the carts "A" and "B", the cart of which the minimum movement amount required to collect the product "5" is minimized is "A" (refer to FIG. 13). In addition, the movement amount required to collect the product of the cart "A" at this point is 5, and the movement amount required to collect the product of the cart "B" is 9 (7+3−1). Therefore, the allocation unit 161 allocates the product "5" to the cart "A" so that the increase in movement amount is minimized (Step S119). In addition, if the movement route with the minimum movement amount for collecting the product "5" by the cart "A" and the movement route with the minimum movement amount for collecting the product "3" are combined, since a portion of the route (route corresponding to one movement amount) can be reduced, in this case, the product "5" is allocated to the cart "A", and the fact that the reducible route is reduced is set.

From the above-described allocation result, the determining unit 163, for example, determines the movement route of the cart "B" as the movement route illustrated in FIG. 15 and determines the movement route of the cart "A" as the movement route illustrated in FIG. 16 (Step S121). In addition, since the movement starting position and the movement ending position of each cart are the same position as described above, in FIGS. 15 to 16, the movement route is determined so that the final movement amount required to collect the products of each cart is doubled, and after collecting the products, the cart returns to the movement ending position.

In addition, according to the above-described reduction setting, the movement route of the cart "B" is the movement amount (18=(7+3−1)×2) which is smaller by two than the movement amount (20=(7+3)×2) obtained by adding the minimum movement amount of the product "1" and the minimum movement amount of the product "4" and doubling the added movement amount. Similarly, according to the above-described reduction setting, the movement route of the cart "A" is the movement amount (12=(5+2−1)×2) which is smaller by two than the movement amount (14= (5+2)×2) obtained by adding the minimum movement amount of the product "3" and the minimum movement amount of the product "5" and doubling the added movement amount.

As a result, the movement route and the movement distance of each cart are as illustrated in FIG. 17, and the movement routes in the entire carts are optimized.

Movement Route Determination Method 3

Next, a movement route determination method for a plurality of carts in the state illustrated in FIG. 18 will be described.

In the example illustrated in FIG. 18, "A", "B", and "C" represent carts, and "1", "2", "3", "4", and "5" represent products collected by the carts. In addition, the movement path through which the cart can move is represented by a network, and the movement starting position and the movement ending position of the cart are assumed to be the same position.

Namely, a movement route determination method from the time when the carts "A", "B" and "C" collect (pick) the products "1", "2", "3", "4", and "5" until returning to the original position in the state illustrated in FIG. 18 will be described.

In the movement route determination method for the carts "A", "B", and "C" in the state illustrated in FIG. 18, in a case where there are a plurality of carts of which the minimum movement amount (minimum movement distance) is minimized, the processes are performed in the alphabetical order. Similarly, in a case where there are a plurality of products of which the minimum value (shortest distance) of the minimum movement amount is maximized, the processes are performed in ascending numerical order. In addition, in the movement route determination method for the carts "A", "B", and "C" in the state illustrated in FIG. 18, the afore-described "allocation method 1" is adopted in Step S119 of the flowchart illustrated in FIG. 4. In addition, in the example illustrated in FIG. 18, a plurality of carts are arranged locally.

First, as illustrated in FIG. 19, the calculation unit 159 calculates the minimum movement amount for each of a plurality of carts for each product. In addition, as illustrated in FIG. 20, the calculation unit 159 also calculates the shortest distance between carts. In addition, the shortest distance between the carts illustrated in FIG. 20 is used in the determination formula for determining a degree of variation, so that the shortest distance is not used in a case where there is no need to use the determination formula.

Subsequently, since the product of which the minimum value of the minimum movement amount is maximized among the plurality of products is the product "1" (refer to FIG. 19), the allocation unit 161 allocates the product "1" to the cart "A" (refer to FIG. 19) of which the minimum movement amount required to collect the product "1" is minimized (Step S105). In addition, since the product "2" exists on the movement route where the cart "A" is to collect the product "1" with the minimum movement amount (refer to FIG. 18) and the product "2" is not allocated with the cart, the allocation unit 161 further allocates the product "2" to the cart "A" (Step S107).

Subsequently, in a case where the products "3", "4", and "5" are unallocated (Yes in Step S109), since the cart "C" (refer to FIG. 19) of which the minimum movement amount required to collect the product "3" (refer to FIG. 19) of which the minimum value of the minimum movement amount is maximized among the products "3", "4", and "5" is minimized is unallocated (Yes in Step S111), the allocation unit 161 allocates the product "3" to the cart "C" (Step S113).

Subsequently, in a case where the products "4" and "5" are unallocated (Yes in Step S109), the cart "C" of which the minimum movement amount required to collect the product "4" (refer to FIG. 19) of which the minimum value of the minimum movement amount is maximized among the products "4" and "5" is minimized is not unallocated (No in Step S111). Herein, since the minimum movement amount (4, refer to FIG. 19) between the cart "B" and the product "4"=the distance (2, refer to FIG. 20) between the cart "B" and the cart "C"+the minimum movement amount (2, refer to FIG. 19) between the cart "C" and the product "4", the unallocated cart "B" satisfies the determination formula for determining a degree of variation and the condition that no product is allocated (Yes in Step S115). Therefore, the allocation unit 161 allocates the product "4" to the cart "B" (Step S117).

Subsequently, in a case where the product "5" is unallocated (Yes in Step S109), if the carts "A", "B", and "C" of which the minimum movement amount required to collect the product "5" is minimized are not unallocated (No in Step S111), no unallocated cart remains (No in Step S115). Herein, among the carts "A", "B", and "C", the carts of which the minimum movement amount required to collect the product "5" is minimized are "A", "B", and "C" (refer to FIG. 19). In addition, the movement amount required to collect the product of the cart "A" at this point is 8, the movement amount required to collect the product of the cart "B" is 4, and the movement amount required to collect the product of the cart "C" is 5. Therefore, the allocation unit 161 allocates the product "5" to the cart "B" so that the increase in movement amount is minimized (Step S119). In addition, if the movement route with the minimum movement amount for collecting the product "5" by the cart "B" and the movement route with the minimum movement amount for collecting the product "4" are combined, since a portion of the route (route corresponding to one movement amount) can be reduced, in this case, the product "5" is allocated to the cart "B", and the fact that the reducible route is reduced is set.

From the above-described allocation results, the determining unit 163, for example, determines the movement route of the cart "A" as the movement route illustrated in FIG. 21, determines the movement route of the cart "C" as the movement route illustrated in FIG. 22, and determines the movement route of the cart "B" as the movement route illustrated in FIG. 23 (Step S121). In addition, since the movement starting position and the movement ending position of each cart are the same position as described above, in FIGS. 21 to 23, the movement route is determined so that the final movement amount required to collect the products of each cart is doubled, and after collecting the products, the cart returns to the movement ending position.

In addition, according to the above-described reduction setting, the movement route of the cart "B" is the movement amount (10=(4+2−1)×2) which is smaller by two than the movement amount (12=(4+2)×2) obtained by adding the minimum movement amount of the product "4" and the minimum movement amount of the product "5" and doubling the added movement amount.

As a result, the movement route and the movement distance of each cart are as illustrated in FIG. 24, and the movement routes in the entire carts are optimized.

Movement Route Determination Method 4

Next, a movement route determination method for a plurality of carts in the state illustrated in FIG. 25 will be described.

In the example illustrated in FIG. 25, "A", "B", and "C" represent carts, and "1", "2", "3", "4", and "5" represent products collected by the cart, and "G" represents the movement ending position of the carts "A", "B", and "C". Namely, the movement starting position and the movement ending position of the cart are different positions. In addition, the movement path through which the cart can move is represented by a network.

Namely, a movement route determination method from the time when the carts "A", "B" and "C" collect (pick) the products "1", "2", "3", "4", and "5" until returning to the movement ending position "G" in the state illustrated in FIG. 25 will be described.

In the movement route determination method for the carts "A", "B", and "C" in the state illustrated in FIG. 25, in a case where there are a plurality of carts of which the minimum movement amount (minimum movement distance) is minimized, the processes are performed in the alphabetical order. Similarly, in a case where there are a plurality of products of which the minimum value (shortest distance) of the minimum movement amount is maximized, the processes are performed in ascending numerical order. In addition, in the movement route determination method for the carts "A", "B", and "C" in the state illustrated in FIG. 25, the afore-described "allocation method 1" is adopted in Step S119 of the flowchart illustrated in FIG. 4.

First, as illustrated in FIG. 26, the calculation unit 159 calculates the minimum movement amount up to the product for each of the plurality of carts for each product. In addition, as illustrated in FIG. 27, the calculation unit 159 also calculates the shortest distance from the movement ending position "G" for each product. Then, as illustrated in FIG. 28, the calculation unit 159 calculates the minimum movement amount up to the movement ending position "G" for each of the plurality of carts for each product by using FIGS. 26 and 27. In addition, as illustrated in FIG. 7, the calculation unit 159 also calculates the shortest distance between the carts. In addition, the shortest distance between the carts illustrated in FIG. 7 is used in the determination formula for determining a degree of variation, so that the shortest distance is not used in a case where there is no need to use the determination formula.

Subsequently, since the product of which the minimum value of the minimum movement amount up to the movement ending position "G" is maximized among the plurality of products is the product "1" (refer to FIG. 28), the allocation unit 161 allocates the product "1" to the cart "B" (refer to FIG. 28) of which the minimum movement amount required to collect the product "1" and to reach the movement ending position "G" is minimized (Step S105). In addition, since the product "2" exists (refer to FIG. 25) on the movement route where the cart "B" is to collect the product "1" with the minimum movement amount and is to reach the movement ending position "G" and the product "2" is not allocated with the cart, the allocation unit 161 further allocates the product "2" to the cart "B" (Step S107).

Subsequently, in a case where the products "3", "4", and "5" are unallocated (Yes in Step S109), since the cart "C" (refer to FIG. 28) of which the minimum movement amount required to collect the product "4" (refer to FIG. 28) of which the minimum value of the minimum movement amount up to the movement ending position "G" is maximized among the products "3", "4", and "5" and to reach the movement ending position "C" is minimized is unallocated (Yes in Step S111), the allocation unit 161 allocates the product "4" to the cart "C" (Step S113). In addition, since the product "3" exists (refer to FIG. 25) on the movement route where the cart "C" is to collect the product "4" with the minimum movement amount and is to reach the movement ending position "G" and the product "3" is not allocated with the cart, the allocation unit 161 further allocates the product "3" to the cart "C" (Step S107).

Subsequently, if the product "5" is unallocated (Yes in Step S109), since the cart "A" of which the minimum movement amount required for collect the product "5" and to reach the movement ending position "G" is minimized is unallocated (Yes in Step S111), the allocation unit 161 allocates the product "5" to the cart "A" (Step S113).

From the above-described allocation result, the determining unit 163, for example, determines the movement route of the cart "B" as the movement route illustrated in FIG. 29, determines the movement route of the cart "C" as the movement route illustrated in FIG. 30, and determines the movement route of the cart "A" as the movement route illustrated in FIG. 31 (Step S121).

As a result, the movement route and the movement distance of each cart are as illustrated in FIG. 32, and the movement routes in the entire carts are optimized.

Movement Route Determination Method 5

Next, another movement route determination method for a plurality of carts in the state illustrated in FIG. 5 will be described. Herein, in the movement route determination method for the carts "A", "B", and "C", the afore-described "allocation method 2" is adopted in Step S119 of the flowchart illustrated in FIG. 4.

First, as illustrated in FIG. 6, the calculation unit 159 calculates the minimum movement amount for each of the plurality of carts for each product. In addition, as illustrated in FIG. 7, the calculation unit 159 also calculates the shortest distance between the carts. In addition, since the shortest distance between the carts illustrated in FIG. 7 is used in a determination formula for determining a degree of variation, the shortest distance is not used in a case where there is no need to use the determination formula. In addition, as illustrated in FIG. 33, the calculation unit 159 also calculates the shortest distance between products.

Subsequently, since the product of which the minimum value of the minimum movement amount is maximized among the plurality of products is the product "1" (refer to FIG. 6), the allocation unit 161 allocates the product "1" to the cart "B" (refer to FIG. 6) of which the minimum movement amount required to collect the product "1" is minimized (Step S105). In addition, since the product "2" exists on the movement route where the cart "B" is to collect product "1" with the minimum movement amount (refer to FIG. 5) and the product "2" is not allocated with the cart, the allocation unit 161 further allocates the product "2" to the cart "B" (Step S107).

Subsequently, in a case where the products "3", "4", and "5" are unallocated (Yes in Step S109), since the cart "A" (refer to FIG. 6) of which the minimum movement amount required to collect the product "3" (refer to FIG. 6) of which the minimum value of the minimum movement amount is maximized among the products "3", "4", and "5" is minimized is unallocated (Yes in Step S111), the allocation unit 161 allocates the product "3" to the cart "A" (Step S113).

Subsequently, in a case where the products "4" and "5" are unallocated (Yes in Step S109), since the cart "C" of which the minimum movement amount required to collect the product "4" (refer to FIG. 6) of which the minimum value of the minimum movement amount is maximized among the products "4" and "5" is minimized is unallocated (Yes in Step S111), the allocation unit 161 allocates the product "4" to the cart "C" (Step S113).

Subsequently, in a case where the product "5" is unallocated (Yes in Step S109), if the carts "A" and "C" of which the minimum movement amount required to collect the product "5" is minimized are not unallocated (No in Step S111), no unallocated carts remain (No in Step S115). Herein, the product having the shortest distance on the movement path from the product "5" is the product "4" (refer to FIG. 33), and the cart allocated to the product "4" is the cart "C". Therefore, the allocation unit 161 allocates the product "5" to the cart "C" so that the increase in movement amount is minimized (Step S119). In addition, even if the movement route with the minimum movement amount for collecting the product "4" by the cart "C" and the movement route with the minimum movement amount for collecting the product "5" are combined, since a portion of the route can be reduced, in this case, it is enough to allocate the product "5" to the cart "C".

From the above-described allocation result, the determining unit 163 determines the movement route of the cart "B" as the movement route illustrated in FIG. 8, determines the movement route of the cart "A" as the movement route illustrated in FIG. 9, and determines the movement route of the cart "C" as the movement route illustrated in FIG. 10 (Step S121). Since the movement starting position and the movement ending position of each cart are the same position as described above, in FIGS. 8 to 10, the movement route is determined so that the final movement amount required to collect the products of each cart is doubled, and after collecting the products, the cart returns to the movement ending position. As a result, the movement route and the movement distance of each cart are as illustrated in FIG. 11, and the movement routes in the entire carts are optimized.

Movement Route Determination Method 6

Next, another movement route determination method for a plurality of carts in the state illustrated in FIG. 5 will be described. Herein, in the movement route determination method for the carts "A", "B", and "C", the afore-described "allocation method 3" is adopted in Step S119 of the flowchart illustrated in FIG. 4.

First, as illustrated in FIG. 6, the calculation unit 159 calculates the minimum movement amount for each of the plurality of carts for each product. In addition, as illustrated in FIG. 7, the calculation unit 159 also calculates the shortest distance between the carts. In addition, the shortest distance between the carts illustrated in FIG. 7 is used in the determination formula for determining a degree of variation, so that the shortest distance is not used in a case where there is no need to use the determination formula.

Subsequently, since the product of which the minimum value of the minimum movement amount is maximized among the plurality of products is the product "1" (refer to FIG. 6), the allocation unit 161 allocates the product "1" to the cart "B" (refer to FIG. 6) of which the minimum movement amount required to collect the product "1" is minimized (Step S105). In addition, since the product "2" exists on the movement route where the cart "B" is to collect the product "1" with the minimum movement amount (refer to FIG. 5) and the product "2" is not allocated with the cart, the allocation unit 161 further allocates the product "2" to the cart "B" (Step S107).

Subsequently, in a case where the products "3", "4", and "5" are unallocated (Yes in Step S109), since the cart "A" (refer to FIG. 6) of which the minimum movement amount required to collect the product "3" (refer to FIG. 6) of which the minimum value of the minimum movement amount is maximized among the products "3", "4", and "5" is minimized is unallocated (Yes in Step S111), the allocation unit 161 allocates the product "3" to the cart "A" (Step S113).

Subsequently, in a case where the products "4" and "5" are unallocated (Yes in Step S109), since the cart "C" of which the minimum movement amount required to collect the product "4" (refer to FIG. 6) of which the minimum value of the minimum movement amount is maximized among the products "4" and "5" is minimized is unallocated (Yes in Step S111), the allocation unit 161 allocates the product "4" to the cart "C" (Step S113).

Subsequently, in a case where the product "5" is unallocated (Yes in Step S109), if the carts "A" and "C" of which the minimum movement amount required to collect the product "5" is minimized are not unallocated (No in Step S111), no unallocated carts remain (No in Step S115). Herein, as illustrated in FIG. 34, with respect to each of the carts "A", "B", and "C", the calculation unit 159 calculates the distance of the case of being closest to the product "5" in the case of moving the movement route with the movement amount at the present time. Herein, in the case of being closest to the product "5", the cart having the shortest distance is the cart "A" (refer to FIG. 34). Therefore, the allocation unit 161 allocates the product "5" to the cart "A" so that the increase in movement amount is minimized (Step S119). In addition, if the movement route with the minimum movement amount for collecting the product "5" by the cart "A" and the movement route with the minimum movement amount for collecting the product "3" are combined, since a portion of the route (route corresponding to one movement amount) can be reduced, in this case, the product "5" is allocated to the cart "A", and the fact that the reducible route is reduced is set.

From the above-described allocation result, the determining unit 163, for example, determines the movement route of the cart "B" as the movement route illustrated in FIG. 8, determines the movement route of the cart "A" as the movement route illustrated in FIG. 35, and determines the movement route of the cart "C" as the movement route illustrated in FIG. 36 (Step S121). In addition, since the movement starting position and the movement ending position of each cart are the same position as described above, in FIGS. 15 to 16, the movement route is determined so that the final movement amount required to collect the products of each cart is doubled, and after collecting the products, the cart returns to the movement ending position.

In addition, according to the above-described reduction setting, the movement route of the cart "A" is the movement amount $(12=(5+2-1)\times 2)$ which is smaller by two than the movement amount $(14=(5+2)\times 2)$ obtained by adding the minimum movement amount of the product "3" and the minimum movement amount of the product "5" and doubling the added movement amount.

As a result, the movement route and the movement distance of each cart are as illustrated in FIG. 37, and the movement routes in the entire carts are optimized.

As described above, according to the first embodiment, since the movement routes of a plurality of moving bodies are determined by the determination method (algorithm) as described above, not the searching method (for example, a genetic algorithm), the calculation amount can be greatly reduced as compared with the searching method, and thus, it is possible to optimize the movement routes in the entire moving bodies while suppressing the time required for determining the movement routes of the plurality of moving bodies.

Second Embodiment

In the second embodiment, a movement route determination method suitable for delivery to a plurality of delivery target destinations by a plurality of moving bodies will be described. In the following, differences from the first embodiment will be mainly described, the components having the same functions as those in the first embodiment will be denoted by the same names and reference numerals as those in the first embodiment, and the description thereof will be omitted.

FIG. 38 is a block diagram illustrating an example of a functional configuration of an information processing device 1010 of an information processing system 1000 according to a second embodiment. As illustrated in FIG. 38, the second embodiment is different from the first embodiment in that the movement ending position information acquisition unit 153 is a movement-pass-through position information acquisition unit 1153 and in terms of a target position information acquisition unit 1155, a calculation unit 1159, and an allocation unit 1161.

The movement-pass-through position information acquisition unit 1153 acquires movement-pass-through position information indicating a movement-pass-through position of a plurality of moving bodies. In the second embodiment, the movement-pass-through position indicated by the movement-pass-through position information indicates any position on a movement path indicated by movement path information. In the second embodiment, it is assumed that delivery target products to be delivered to delivery target destinations are collected at the movement-pass-through position, but the present invention is not limited thereto. In addition, the movement-pass-through position may be the same position as the movement starting position or may be a position different from the movement starting position. In a case where the movement-pass-through position is different from the movement starting position, for example, the movement-pass-through position may be specified on the movement path information acquired by the movement path information acquisition unit 157. In addition, the movement-pass-through position information may be two-dimensional coordinate information indicating a corresponding point on the movement path or may be identification information (for example, a point ID) for identifying the corresponding point.

The target position information acquisition unit 1155 acquires delivery target destination position information indicating a position of a delivery target destination for each of the plurality of delivery target destinations by the plurality of moving bodies. In the second embodiment, the delivery target destination of the delivery target object is designated from the terminal device 20 for each delivery target object to be delivered. For example, the terminal device 20 gives notice of a combination of the identification information (for example, product ID) of the delivery target object and the delivery target destination position information of the delivery target object, so that the target position information acquisition unit 1155 specifies delivery target destination of the delivery target object for each delivery target object to be delivered.

The calculation unit 1159 calculates the minimum movement amount required for the moving body to move on the movement path from the movement starting position through the movement-pass-through position until delivery to the delivery target destination for each of the plurality of moving bodies for each delivery target destination on the basis of the plurality of pieces of movement starting position information acquired by the movement starting position information acquisition unit 151, the movement-pass-through position information acquired by the movement-pass-through position information acquisition unit 1153, the plurality of pieces of delivery target destination position information acquired by the target position information acquisition unit 1155, and the movement path information acquired by the movement path information acquisition unit 157. In the second embodiment, a case where the minimum movement amount and the later-described movement amount are distances will be described as an example, but the present invention is not limited thereto, and the minimum movement amount and the movement amount may be time.

In addition, in a case where the movement starting position and the movement-pass-through position are the same position, the calculation unit 1159 may not use the movement-pass-through position information and may calculate the minimum movement amount as the movement amount required for the moving body to move on the movement path from the movement starting position until delivery to the delivery target destination.

In addition, the minimum movement amount may be calculated by using a well-known technique such as a Dijkstra method or an A* star method. In addition, in a case where a plurality of movement routes with the minimum movement amount exist, the calculation unit 1159 obtains the entire movement routes.

The allocation unit 1161 allocates the delivery target destinations that are not allocated to the delivering moving bodies among the plurality of delivery target destinations to the moving body of which the minimum movement amount required for delivery to a delivery target destination is minimized and to which no delivery target destination is allocated among the plurality of moving bodies in descending order of the minimum values of the minimum movement amount of the delivery target destinations, if there are the delivery target destinations that are not allocated to the delivering moving body on the movement route where the allocated moving body delivers to the delivery target destination with the minimum movement amount and the allocation unit further allocates the delivery target destinations that are not allocated to the delivering moving body to the allocated moving body.

In addition, in a case where there is no moving body of which the minimum movement amount required for delivery to the delivery target destination is minimized and to which no delivery target destination is allocated, if there are one or more moving bodies which satisfy the determination formula for determining a degree of variation and to which no delivery target destination is allocated, the allocation unit 1161 allocates the delivery target destination to the moving body of which the minimum movement amount required for delivery to the delivery target destination is minimized among the one or more moving bodies.

As the determination formula for determining a degree of variation, the minimum movement amount between the moving body X and the delivery target destination Q=the distance between the moving body X and the moving body Y+the minimum movement amount between the moving body Y and the delivery target destination Q, but the present invention is not limited thereto. In addition, the moving body X is a moving body to be determined as to whether or not to satisfy the determination formula, the delivery target destination Q is a delivery target destination to be allocated, and the moving body Y is an arbitrary moving body.

In addition, in a case where there is no moving body of which the minimum movement amount required for delivery to the delivery target destination is minimized and to which no delivery target destination is allocated, and there is no moving body which satisfies the determination formula for determining a degree of variation and to which no delivery target destination is allocated, the allocation unit 1161 may allocate the delivery target destination to the moving body of which the minimum movement amount required for delivery to the delivery target destination is minimized and of which the movement amount is minimized among the plurality of moving bodies.

In addition, in a case where there is no moving body of which the minimum movement amount required for delivery to the delivery target destination is minimized and to which no delivery target destination is allocated, and there is no moving body which satisfies the determination formula for determining a degree of variation and to which no delivery target destination is allocated, the allocation unit 1161 may allocate the delivery target destination to the moving body to deliver to the delivery target destination having the shortest distance on the movement path from the delivery target destination.

In addition, in a case where there is no moving body of which the minimum movement amount required for delivery to the delivery target destination is minimized and to which no delivery target destination is allocated, and there is no moving body which satisfies the determination formula for determining a degree of variation and to which no delivery target destination is allocated, the allocation unit 1161 may allocate the delivery target destination to the moving body of which the movement amount is minimized among one or more moving bodies closest to the delivery target destination on the movement path.

In addition, in a case where there is no moving body of which the minimum movement amount required for delivery to the delivery target destination is minimized and to which no delivery target destination is allocated, and there is no moving body which satisfies the determination formula for determining a degree of variation and to which no delivery target destination is allocated, the allocation unit 1161 may allocate the delivery target destination to the moving body by using such a searching method (genetic algorithm) as disclosed in PTL 1.

In addition, the allocation unit 1161 allocates the delivery target destination to the moving body of which the movement amount is minimized so that the increase in the movement amount of the moving body of which the minimum movement amount is minimized is minimized.

FIG. 39 is a flowchart illustrating an example of a movement route determination process performed by the information processing system 1000 according to the second embodiment. In addition, in the flowchart illustrated in FIG. 39, a case where the moving body is a cart and the delivery target destination is a storage destination of the delivery target product will be described as an example.

First, prior to determining the movement route, the movement starting position information acquisition unit 151 acquires the movement starting position information of each of the plurality of carts, the movement-pass-through position information acquisition unit 1153 acquires the movement-pass-through position information of the plurality of carts, the target position information acquisition unit 1155 acquires the delivery target destination position information of each storage destination of the delivery target product, and the movement path information acquisition unit 157 acquires the movement path information (Step S201). In addition, in a case where it is known in advance that the movement starting position and the movement-pass-through position of the cart are the same, the acquisition of the movement-pass-through position information of the plurality of carts by the movement-pass-through position information acquisition unit 1153 may be omitted.

Subsequently, the calculation unit 1159 calculates the minimum movement amount required for the cart to move on the movement path from the movement starting position through the movement-pass-through position until delivery to the storage destination for each of the plurality of carts for each storage destination on the basis of the plurality of pieces of movement starting position information acquired by the movement starting position information acquisition unit 151, the movement-pass-through position information acquired by the movement-pass-through position information acquisition unit 1153, the plurality of pieces of delivery target destination position information acquired by the target position information acquisition unit 1155, and the movement path information acquired by the movement path information acquisition unit 157 (Step S203). In addition, in a case where the movement starting position and the movement-pass-through position are the same position, the calculation unit 1159 may not use the movement-pass-through position information and may calculate the minimum movement amount as the movement amount required for the cart to move on the movement path from the movement starting position until delivery to the storage destination.

Subsequently, the allocation unit 1161 allocates the storage destination of which the minimum value of the minimum movement amount is maximized among all the storage destinations to the cart of which the minimum movement amount to the storage destination is minimized among the plurality of carts (Step S205).

Subsequently, if there is a storage destination that is not allocated to the delivering cart on the movement route where the allocated cart is to deliver to the storage destination with the minimum movement amount, the allocation unit 1161 further allocates the storage destination that is not allocated to the delivering cart to the allocated cart (Step S207).

Subsequently, in a case where a storage destination that is not allocated to the delivering cart remains (Yes in Step S209), if the cart of which the minimum movement amount required for delivery to the storage destination of which the minimum value of the minimum movement amount is maximized among the one or more remaining storage destinations is minimized is unallocated (Yes in Step S211), the allocation unit 1161 allocates the storage destination of which the minimum value of the minimum movement amount is maximized to the cart (Step S213). Then, the process returns to Step S207.

On the other hand, in a case where the cart of which the minimum movement amount required for delivery to the storage destination of which the minimum value of the minimum movement amount is maximized among the one or more remaining storage destinations is minimized is not unallocated (No in Step S211), if there are one or more carts which satisfy the determination formula for determining a degree of variation and to which no storage destination is allocated (Yes in Step S215), the allocation unit 1161 allocates the storage destination of which the minimum value of the minimum movement amount is maximized to the cart of which the minimum movement amount required for delivery to the storage destination of which the minimum value of the minimum movement amount is maximized is minimized among the one or more carts (Step S217). Then, the process returns to Step S207.

In addition, if there are no one or more carts which satisfy the determination formula for determining a degree of variation and to which no storage destination is allocated (No in Step S215), the allocation unit 1161 allocates the storage destination of which the minimum value of the minimum movement amount is maximized to the cart of which the minimum movement amount required for delivery to the storage destination of which the minimum value of the minimum movement amount is maximized among one or more remaining storage destinations is minimized and of which the movement amount is minimized among the plurality of carts, so that the increase in the movement amount is minimized (Step S219). Hereinafter, this allocation method may be referred to as an "allocation method 4". Then, the process returns to Step S207.

In addition, with respect to the process of Step S219, the storage destination of which the minimum value of the minimum movement amount is maximized may be allocated to the cart which delivers to the storage destination having the shortest distance on the movement path from the storage destination of which the minimum value of the minimum movement amount is maximized among the one or more remaining storage destinations so that the increase in the movement amount is minimized. Hereinafter, this allocation method may be referred to as an "allocation method 5".

Regarding the process of Step S219, the storage destination of which the minimum value of the minimum movement amount is maximized may be allocated to the cart of which the movement amount is minimized among the one or more carts which are closest on the movement path to the storage destination of which the minimum value of the minimum movement amount is maximized among the one or more remaining storage destinations, so that the increase in the movement amount is minimized. Hereinafter, this allocation method may be referred to as an "allocation method 6".

In Step S209, in a case where no storage destination which is not allocated to the delivering cart remains (No in Step S209), the determining unit 163 determines the movement routes of a plurality of carts on the basis of the allocation result of the allocation unit 1161 and transmits the movement route information indicating the movement route of the cart to the output device 30 associated with the cart for each cart (Step S221).

Subsequently, each output device 30 outputs the movement route indicated by the movement route information transmitted from the information processing device 1010 (Step S223). Therefore, the user who is to move the cart associated with the output device 30 can check the movement route which is optimized for the cart and can move the cart with the optimized movement route.

Hereinafter, a movement route determination method for a plurality of carts will be described by using specific examples.

Hereinafter, the movement route determination method for a plurality of carts in the state illustrated in FIG. 40 will be described. In the example illustrated in FIG. 40, "A", "B", and "C" represent carts, "S" represents a movement-pass-through position (collection position of a delivery target product), and "1", "2", "3", "4", and "5" represent storage destinations. In addition, the movement path through which the cart can move is represented by a network. With respect to the carts "A" and "B", the movement starting position and the movement-pass-through position are assumed to be the same position, and with respect to the cart "C", the movement starting position and the movement-pass-through position are assumed to be different positions. These are specified on the basis of the plurality of pieces of movement starting position information acquired by the movement starting position information acquisition unit 151, the movement-pass-through position information acquired by the movement-pass-through position information acquisition unit 1153, the plurality of pieces of delivery target destination position information acquired by the target position information acquisition unit 1155, and the movement path information acquired by the movement path information acquisition unit 157.

Namely, a movement route determination method from the time when the carts "A", "B", and "C" collect the delivery target products at the movement-pass-through position "S" and until delivering (storing) to the storage destinations "1", "2", "3", "4" and "5" in the state illustrated in FIG. 40 will be described.

In the movement route determination method for the carts "A", "B", and "C" in the state illustrated in FIG. 40, in a case where there are a plurality of carts of which the minimum movement amount (minimum movement distance) is minimized, the processes are performed in the alphabetical order. Similarly, in a case where there are a plurality of storage destinations of which the minimum value (shortest distance) of the minimum movement amount is maximized, the processes are performed in ascending numerical order. In addition, in the movement route determination method for the carts "A", "B", and "C" in the state illustrated in FIG. 40, the afore-described "allocation method 4" is employed in Step S219 of the flowchart illustrated in FIG. 39.

First, as illustrated in FIG. 41, the calculation unit 1159 calculates the shortest distance to the movement-pass-through position "S" for each storage destination. In addition, as illustrated in FIG. 43, the calculation unit 1159 also calculates the shortest distance from the movement-pass-through position "S" for each cart. Then, as illustrated in FIG. 44, the calculation unit 1159 calculates the minimum movement amount in the case of passing through the movement-pass-through position from the movement starting position for each of the plurality of carts, for each storage destination by using FIGS. 41 and 43. In addition, as illustrated in FIG. 42, the calculation unit 1159 also calculates the shortest distance between the carts. In addition, the shortest distance between the carts illustrated in FIG. 42 is used in the determination formula for determining a degree of variation, so that the shortest distance is not used in a case where there is no need to use the determination formula.

Subsequently, since the storage destination of which the minimum value of the minimum movement amount is maximized among the plurality of storage destinations is the storage destination "1" (refer to FIG. 44), the allocation unit 1161 allocates the storage destination "1" to the cart "A" (refer to FIG. 44) of which the minimum movement amount required for delivery to the storage destination "1" is minimized (Step S205). In addition, since the storage destinations "2" and "5" exist (refer to FIG. 40) on the movement route where the cart "A" is to deliver to storage destination "1" with minimum movement amount and the storage destinations "2" and "5" are not allocated with the cart, the allocation unit 1161 further allocates the storage destinations "2" and "5" to the cart "A" (Step S207).

Subsequently, in a case where the storage destinations "3" and "4" are unallocated (Yes in Step S209), since the cart "B" (refer to FIG. 44) of which the minimum movement amount required for delivery to the storage destination (refer to FIG. 44) "3" of which the minimum value of the minimum movement amount is maximized among the storage destinations "3" and "4" is minimized is unallocated (Yes in Step S211), the allocation unit 1161 allocates the storage destination "3" to the cart "B" (Step S213).

Subsequently, the storage destination "4" is unallocated (Yes in Step S209), and the carts "A" and "B" of which the minimum movement amount required for delivery to the storage destination "4" is minimized are not unallocated (No in Step S211). Herein, since the minimum movement amount (6, refer to FIG. 40) between the cart "C" at the movement-pass-through position "S" and the storage destination "4"=the distance (2, refer to FIG. 40) between the cart "C" and the cart "A"+the minimum movement amount (4, refer to FIG. 40) between the cart "A" and the storage destination "4", the unallocated cart "C" satisfies the determination formula for determining a degree of variation. Therefore, the allocation unit 1161 allocates the product "4" to the cart "C" (Step S217).

From the above-described allocation results, the determining unit 163, for example, determines the movement route of the cart "B" as the movement route illustrated in FIG. 45, determines the movement route of the cart "A" as the movement route illustrated in FIG. 46, and determines the movement route of the cart "C" as the movement route illustrated in FIG. 47 (Step S221). As a result, the movement route and movement distance of each cart are as illustrated in FIG. 48, and the movement routes in the entire carts are optimized.

As described above, according to the second embodiment, since the movement routes of a plurality of moving bodies are determined by the determination method (algorithm) as described above, not the searching method (for example, a genetic algorithm), the calculation amount can be greatly reduced as compared with the searching method, and thus, it is possible to optimize the movement routes in the entire moving bodies while suppressing the time required for determining the movement routes of the plurality of moving bodies.

Third Embodiment

In the third embodiment, a movement route updating method along with the addition of the collection target object after determination of the movement route in the first embodiment will be described. In the following, differences from the first embodiment will be mainly described, the components having the same functions as those in the first embodiment will be denoted by the same names and reference numerals as those in the first embodiment, and the description thereof will be omitted.

FIG. 49 is a block diagram illustrating an example of a functional configuration of an information processing device 2010 of an information processing system 2000 according to a third embodiment. As illustrated in FIG. 49, the third embodiment is different from the first embodiment in terms of a target position information acquisition unit 2155, a calculation unit 2159, an allocation unit 2161, and a determining unit 2163.

After determining the movement routes of the plurality of moving bodies by the determining unit 2163, the target position information acquisition unit 2155 further acquires the additional collection target object position information indicating the positions of the additional collection target objects which are to be additionally collected by the plurality of moving bodies. The method of acquiring the additional collection target object position information is the same as the method of acquiring the collecting target object position information.

The allocation unit 2161 allocates the additional collection target object to any one of a plurality of moving bodies on the basis of the remaining movement amount and the remaining movement route of each of the plurality of moving bodies at the time point when the predetermined time has elapsed from the acquisition of the additional collection target object position information by the target position information acquisition unit 2155. Specifically, the allocation unit 2161 allocates the additional collection target object to the moving body of which the remaining movement amount is minimized among the one or more moving bodies closest to the additional collection target object on the remaining movement route.

The determining unit 2163 updates the movement route of the moving body to which the additional collection target object is allocated on the basis of the allocation result of the allocation unit 2161 and retransmits the movement route information indicating the updated movement route of the moving body to the output device 30 associated with the moving body.

The output device 30 outputs the movement route indicated by the movement route information retransmitted from the information processing device 2010.

FIG. 50 is a flowchart illustrating an example of a movement route updating process performed by the information processing system 2000 according to the third embodiment.

First, the target position information acquisition unit 2155 further acquires additional collection target object position information indicating the position of additional products to be additionally collected by the plurality of carts after determining the movement routes of the plurality of carts by the determining unit 2163 (Step S301).

Subsequently, the calculation unit 2159 acquires the remaining movement amount and the remaining movement route of each of the plurality of carts at the time point when the predetermined time has elapsed from the acquisition of the additional collection target object position information by the target position information acquisition unit 2155 (Step S303).

Subsequently, the calculation unit 2159 calculates the shortest distance from the remaining movement route of each cart to the additional product for each cart (Step S305).

Subsequently, the allocation unit 2161 allocates the additional product to the remaining cart of which the movement amount is minimized among the one or more carts of which the shortest distance to the additional product is minimized on the remaining movement routes so that the increase in the movement amount is minimized (Step S307).

Subsequently, the determining unit 2163 updates the movement route of the cart to which the additional collection target object is allocated on the basis of the allocation result of the allocation unit 2161 and retransmits the movement route information indicating the updated movement route of the cart to the output device 30 associated with the cart (Step S309).

The output device 30 outputs the movement route indicated by the movement route information retransmitted from the information processing device 2010 (Step S311).

Hereinafter, a movement route updating method for a cart accompanying addition of an additional product will be described by using a specific example. Hereinafter, a movement route updating method determined in the "movement route determination method 1" described in the first embodiment will be described.

It is assumed that the state at the time point when the predetermined time has elapsed from the addition of the additional product is the state illustrated in FIG. 51. In the example illustrated in FIG. 51, the product "6" is an additional product. In addition, in the state illustrated in FIG. 51, although the carts "A" to "C" have not started moving yet, the carts "A" to "C" may start moving.

First, as illustrated in FIG. 52, with respect to each of the carts "A", "B", and "C", the calculation unit 2159 calculates the distance of the case of being closest to the additional product "6" in the case of moving the remaining movement route with the remaining movement amount (Steps S303 and S305). The remaining movement route of the cart "B" is as illustrated in FIG. 8, the remaining movement route of the cart "A" is as illustrated in FIG. 9, and the remaining movement route of the cart "C" is as illustrated in FIG. 10.

Herein, since the cart having the shortest distance among the distances of the case of being closest to the additional product "6" is the cart "B" (refer to FIG. 52), the allocation unit 2161 allocates the additional product "6" to the cart "B" so that the increase in the movement amount is minimized (Step S307).

From the above-described allocation result, the determining unit 2163 updates the movement route of the cart "B" from the movement route illustrated in FIG. 8 to the movement route illustrated in FIG. 53.

As described above, also in the third embodiment, since the movement routes of the plurality of moving bodies are determined by the determination method (algorithm) as described above, not the searching method (for example, a genetic algorithm), the calculation amount can be greatly reduced as compared with the searching method, and in a case where it is necessary to update the movement route, it is possible to update the movement route in real time. Therefore, in the third embodiment, even after the movement of the moving body on the determined movement route is started, the movement route can be updated.

In addition, in the case of a searching method (for example, a genetic algorithm), a large calculation amount is required even in a case where the movement route is to be updated, and thus, a lot of time is required to update the movement route, so that, if it is attempted to update the movement route after the movement of the moving body on the movement route is started, the movement route cannot be updated before the movement of the moving body is ended, and the movement route cannot be updated in real time.

Modified Example

In each of the above-described embodiments, the case of collecting (picking) the products by using carts in the warehouse and storing the products by using the carts has been described as an example.

However, the present invention is not limited thereto, and the present invention can be applied to person transportation by a community bus and the like. In this case, the moving body becomes a community bus, the collection target object is a person, the delivery target destination is a place to transport a person, and the movement path is a road.

In addition, the present invention can also be applied to disaster relief plans such as relief of supplies and rescue transportation. In this case, the moving body becomes a car, the collection target object becomes a victim or a material, the delivery target destination becomes a hospital or a shelter, and the movement path becomes a road.

It can also be applied to home delivery or like for collecting and delivering or the like. In this case, the moving body becomes a truck, the collection target object becomes a home delivery product, the delivery target destination is a residence, and the movement path is a road.

In addition, the present invention can be applied to salesperson traveling or the like. In this case, the moving body becomes a car, the collection target object becomes a salesperson, the delivery target destination becomes a visiting place and the movement path becomes a road.

In addition, in a case where the moving body is a car, the output device 30 may be a car navigation system or a projector. In a case where the output device 30 is a projector, a mode of projecting a movement route on the windshield of a car, or the like may be considered.

Program

A program executed by the information processing device 10 according to each embodiment and each Modified Example described above is a file in an installable format or an executable format and is provided in the state where the program is stored in a computer-readable storage medium such as a CD-ROM, a CD-R, a memory card, a digital versatile disk (DVD), or a flexible disk (FD).

In addition, the program executed by the information processing device 10 according to each embodiment and each Modified Example described above may be stored on a computer connected to a network such as the Internet and downloaded via the network so as to be provided. In addition, the program executed by the information processing device 10 according to each embodiment and each Modified Example described above may be provided or distributed via a network such as the Internet. In addition, the program executed by the information processing device 10 according to each embodiment and each Modified Example described above may be provided by being incorporated in a ROM or the like in advance.

The program executed by the information processing device 10 according to each embodiment and each Modified Example described above is a module configuration for realizing each component described above on a computer. As the actual hardware, for example, a CPU reads the program from a ROM to a RAM and executes the program, so that each functional unit is realized on a computer.

In addition, the above-described embodiments and Modified Examples are presented as examples, and it is not intended to limit the scope of the invention. The above-described novel embodiments can be implemented in various other forms, and various omissions, substitutions, and changes can be made without departing from the spirit of the invention. These embodiments are included in the scope and spirit of the invention and are included in the invention described in the claims and the equivalent scope thereof.

REFERENCE SIGNS LIST 1, 1000, 2000 Information processing system
2 Network
10, 1010, 2010 Information processing device
20 Terminal device
30-1 to 30-n (30) Output device
151 Movement starting position information acquisition unit
153 Movement ending position information acquisition unit
155, 1155, 2155 Target position information acquisition unit
157 Movement path information acquisition unit
159, 1159, 2159 Calculation unit
161, 61, 2161 Allocation unit
163, 2163 Determining unit
1153 Movement-pass-through position information acquisition unit

CITATION LIST

Patent Literature

PTL 1: Japanese Laid-open Patent Publication No. 2016-52938

The invention claimed is:

1. A movement route determination method comprising the steps of:
    acquiring pieces of movement starting position information indicating movement starting positions of a plurality of moving bodies, respectively;
    acquiring pieces of movement target destination position information indicating positions of a plurality of movement target destinations, respectively;
    acquiring movement path information indicating movement paths on which the plurality of moving bodies can move;
    calculating, for each of the plurality of moving bodies, a minimum movement amount required for the corresponding moving body to move on a movement path from the corresponding movement starting position to each of the movement target destinations, based on the plurality of pieces of movement starting position information, the plurality of pieces of movement target destination position information, and the movement path information;
    allocating a movement target destination that is not allocated to any one of the moving bodies to a moving body that has a minimum movement amount being the smallest of the minimum movement amounts calculated to the movement target destination and that has no allocation of any movement target destination in descending order of the smallest minimum movement amount among the plurality of movement target destinations;
    further allocating, when there is a movement target destination that is not allocated to the moving body on a movement route where the allocated moving body is to move to the movement target destination with the minimum movement amount, the movement target destination that is not allocated to the moving body to the allocated moving body;
    determining movement routes of the plurality of moving bodies based on an allocation result; and
    causing the plurality of moving bodies to move along the movement routes determined based on the allocation result.

2. The movement route determination method according to claim 1, further comprising the step of allocating, when there is no moving body that has a minimum movement amount being the smallest of the minimum movement amounts calculated to the movement target destination and that has no allocation of any movement target destination and when there are one or more moving bodies that satisfy a determination formula for determining a degree of variation and that have no allocation of any movement target destination, the movement target destination to the moving body that has the smallest minimum movement amount to the movement target destination among the one or more moving bodies.

3. The movement route determination method according to claim 1, further comprising the step of allocating, when there is no moving body that has a minimum movement amount being the smallest of the minimum movement amounts calculated to the movement target destination and that has no allocation of any movement target destination and when there is no moving body that satisfies a determination formula for determining a degree of variation and that has no allocation of any movement target destination, the movement target destination to the moving body that has the smallest minimum movement amount to the movement target destination and has a smallest movement amount among the plurality of moving bodies.

4. The movement route determination method according to claim 1, further comprising the step of allocating, when there is no moving body that has a minimum movement amount being the smallest of the minimum movement amounts calculated to the movement target destination and that has no allocation of any movement target destination and when there is no moving body that satisfies a determination formula for determining a degree of variation and that has no allocation of any movement target destination, the movement target destination to the moving body that is to move to the movement target destination with the shortest distance on a movement path from the movement target destination.

5. The movement route determination method according to claim 1, further comprising the step of allocating, when there is no moving body that has a minimum movement amount being the smallest of the minimum movement amounts calculated to the movement target destination and that has no allocation of any movement target destination and when there is no moving body that satisfies a determination formula for determining a degree of variation and that has no allocation of any movement target destination, the movement target destination to the moving body that has a smallest movement amount among one or more moving bodies that are closest to the movement target destination on a movement path.

6. The movement route determination method according to claim 3, wherein the step of allocating includes allocating the movement target destination to the moving body that has a smallest movement amount so that an increase in the movement amount of the moving body having the smallest movement amount is minimized.

7. The movement route determination method according to claim 1, further comprising the step of acquiring movement ending position information indicating movement ending positions of the plurality of moving bodies, wherein
    the step of calculating includes calculating a minimum movement amount required for the moving body to move on the movement path from the movement starting position to the movement target destination until reaching the movement ending position with respect to each of the plurality of moving bodies for each movement target destination based on the movement ending position information, and
    the step of further allocating includes allocating, when there is a movement target destination that is not allocated to the moving body on a movement route where the allocated moving body is to move to the movement target destination to reach the movement ending position with the minimum movement amount, the movement target destination that is not allocated to the moving body to the allocated moving body.

8. The movement route determination method according to claim 1, further comprising the steps of acquiring movement-pass-through position information indicating a movement-pass-through position of the plurality of moving bodies, wherein
    the step of calculating includes calculating, for each of the plurality of moving bodies, a minimum movement amount required for the corresponding moving body to move on a movement path from the corresponding movement starting position through the movement-pass-through position until delivery to each of the movement target destinations, based on the movement-pass-through position information.

9. The movement route determination method according to claim 1, further comprising the steps of:
- transmitting movement routes of the plurality of moving bodies determined at the step of determining; and
- outputting the movement route of the plurality of moving bodies transmitted at the step of transmitting.

10. A program stored on a non-transitory computer readable medium for causing a computer to execute at least the steps of:
- acquiring pieces of movement starting position information indicating movement starting positions of a plurality of moving bodies, respectively;
- acquiring pieces of movement target destination position information indicating positions of a plurality of movement target destinations, respectively;
- acquiring movement path information indicating movement paths on which the plurality of moving bodies can move;
- calculating, for each of the plurality of moving bodies, a minimum movement amount required for the corresponding moving body to move on a movement path from the corresponding movement starting position to each of the movement target destinations, based on the plurality of pieces of movement starting position information, the plurality of pieces of movement target destination position information, and the movement path information;
- allocating a movement target destination that is not allocated to any one of the moving bodies to a moving body that has a minimum movement amount being the smallest of the minimum movement amounts calculated to the movement target destination and that has no allocation of any movement target destination in descending order of the smallest minimum movement amount among the plurality of movement target destinations;
- further allocating, when there is a movement target destination that is not allocated to the moving body on a movement route where the allocated moving body is to move to the movement target destination with the minimum movement amount, the movement target destination that is not allocated to the moving body to the allocated moving body;
- determining movement routes of the plurality of moving bodies based on an allocation result; and
- causing the plurality of moving bodies to move along the movement routes determined based on the allocation result.

* * * * *